United States Patent
Olshansky

(10) Patent No.: US 11,184,578 B2
(45) Date of Patent: Nov. 23, 2021

(54) AUDIO AND VIDEO RECORDING AND STREAMING IN A THREE-COMPUTER BOOTH

(71) Applicant: On Time Staffing Inc., Golden Valley, MN (US)

(72) Inventor: Roman Olshansky, Plymouth, MN (US)

(73) Assignee: On Time Staffing, Inc., Golden Valley, MN (US)

( * ) Notice: Subject to any disclaimer, the term of this patent is extended or adjusted under 35 U.S.C. 154(b) by 0 days.

(21) Appl. No.: 17/212,688

(22) Filed: Mar. 25, 2021

(65) Prior Publication Data

US 2021/0314521 A1 Oct. 7, 2021

Related U.S. Application Data

(60) Provisional application No. 63/004,329, filed on Apr. 2, 2020.

(51) Int. Cl.
*H04N 5/77* (2006.01)
*H04N 5/247* (2006.01)
(Continued)

(52) U.S. Cl.
CPC ............ *H04N 5/77* (2013.01); *G11B 27/10* (2013.01); *H04N 5/247* (2013.01); *H04N 9/8715* (2013.01); *H04R 1/08* (2013.01)

(58) Field of Classification Search
CPC .......... G06K 9/00718; G06K 9/00744; G06Q 10/1053; H04N 5/77; H04N 5/247; H04N 9/8715; G11B 27/10; H04R 1/08
(Continued)

(56) References Cited

U.S. PATENT DOCUMENTS 1,173,785 A 2/1916 Deagan
1,686,351 A 10/1928 Spitzglass
(Continued)

FOREIGN PATENT DOCUMENTS

AU 2002310201 3/2003
CA 2206105 12/2000
(Continued)

OTHER PUBLICATIONS

Advantage Video Systems, "Jeffrey Stansfield of AVS interviews rep about Air-Hush products at the 2019 NAMM Expo," YouTube video, available at https://www.youtube.com/watch?v=nWzrM99qk_o, accessed Jan. 17, 2021.
(Continued)

*Primary Examiner* — Robert Chevalier
(74) *Attorney, Agent, or Firm* — Pauly, DeVries Smith & Deffner LLC

(57) ABSTRACT

A system and method are presented for recording audio and video of an individual within a kiosk on separate audio and video computers that are locally connected to the kiosk. Instructions are provided to the individual through a locally connected controller computer. A remote user computer requests recorded data from the kiosk. The controller computer prompts the audio and video computers to separately stream audio and video to the remote user computer. The controller computer divides the audio and video data into time segments, and then presents different versions of the session to different users, with each different version comprising a different set of time segments. A central system server provides searching capabilities to the user computer to search and request data from a plurality of remotely located kiosks, each having separate controller, audio, and video computers.

21 Claims, 14 Drawing Sheets

(51) Int. Cl.
  *G11B 27/10* (2006.01)
  *H04R 1/08* (2006.01)
  *H04N 9/87* (2006.01)
  *H04N 5/93* (2006.01)

(58) Field of Classification Search
  USPC .................................. 386/223, 278, 281, 285
  See application file for complete search history.

(56) References Cited

U.S. PATENT DOCUMENTS

| | | | |
|---|---|---|---|
| 3,152,622 A | 10/1964 | Rothermel | |
| 3,764,135 A | 10/1973 | Madison | |
| 5,109,281 A | 4/1992 | Kobori et al. | |
| 5,410,344 A | 4/1995 | Graves et al. | |
| 5,835,667 A | 11/1998 | Wactlar et al. | |
| 5,867,209 A | 2/1999 | Irie et al. | |
| 5,884,004 A | 3/1999 | Sato et al. | |
| 5,886,967 A | 3/1999 | Aramaki | |
| 5,897,220 A | 4/1999 | Huang et al. | |
| 5,906,372 A | 5/1999 | Recard, Jr. | |
| 5,937,138 A | 8/1999 | Fukuda et al. | |
| 5,949,792 A | 9/1999 | Yasuda et al. | |
| 6,128,414 A | 10/2000 | Liu | |
| 6,229,904 B1 | 5/2001 | Huang et al. | |
| 6,289,165 B1 | 9/2001 | Abecassis | |
| 6,484,266 B2 | 11/2002 | Kashiwagi et al. | |
| 6,502,199 B2 | 12/2002 | Kashiwagi et al. | |
| 6,504,990 B1 | 1/2003 | Abecassis | |
| RE37,994 E | 2/2003 | Fukuda et al. | |
| 6,600,874 B1 | 7/2003 | Fujita et al. | |
| 6,618,723 B1 | 9/2003 | Smith | |
| 6,981,000 B2 | 12/2005 | Park et al. | |
| 7,095,329 B2 | 8/2006 | Saubolle | |
| 7,146,627 B1 | 12/2006 | Ismail et al. | |
| 7,293,275 B1 | 11/2007 | Krieger et al. | |
| 7,313,539 B1 | 12/2007 | Pappas et al. | |
| 7,336,890 B2 | 2/2008 | Lu et al. | |
| 7,499,918 B2 | 3/2009 | Ogikubo | |
| 7,606,444 B1 | 10/2009 | Erol et al. | |
| 7,702,542 B2 | 4/2010 | Aslanian, Jr. | |
| 7,725,812 B1 | 5/2010 | Balkus et al. | |
| 7,797,402 B2 | 9/2010 | Roos | |
| 7,810,117 B2 | 10/2010 | Karnalkar et al. | |
| 7,865,424 B2 | 1/2011 | Pappas et al. | |
| 7,895,620 B2 * | 2/2011 | Haberman | G06Q 30/0276 725/35 |
| 7,904,490 B2 | 3/2011 | Ogikubo | |
| 7,962,375 B2 | 6/2011 | Pappas et al. | |
| 7,974,443 B2 | 7/2011 | Kipman et al. | |
| 7,991,635 B2 | 8/2011 | Hartmann | |
| 7,996,292 B2 | 8/2011 | Pappas et al. | |
| 8,032,447 B2 | 10/2011 | Pappas et al. | |
| 8,046,814 B1 | 10/2011 | Badenell | |
| 8,111,326 B1 | 2/2012 | Talwar | |
| 8,169,548 B2 | 5/2012 | Ryckman | |
| 8,185,543 B1 | 5/2012 | Choudhry et al. | |
| 8,229,841 B2 | 7/2012 | Pappas et al. | |
| 8,238,718 B2 | 8/2012 | Toyama et al. | |
| 8,241,628 B2 | 8/2012 | Diefenbach-Streiber et al. | |
| 8,266,068 B1 | 9/2012 | Foss et al. | |
| 8,300,785 B2 | 10/2012 | White | |
| 8,301,550 B2 | 10/2012 | Pappas et al. | |
| 8,301,790 B2 | 10/2012 | Morrison et al. | |
| 8,326,133 B2 | 12/2012 | Lemmers | |
| 8,326,853 B2 | 12/2012 | Richard et al. | |
| 8,331,457 B2 | 12/2012 | Mizuno et al. | |
| 8,331,760 B2 | 12/2012 | Butcher | |
| 8,339,500 B2 | 12/2012 | Hattori et al. | |
| 8,358,346 B2 | 1/2013 | Hikita et al. | |
| 8,387,094 B1 | 2/2013 | Ho et al. | |
| 8,505,054 B1 | 8/2013 | Kirley | |
| 8,508,572 B2 | 8/2013 | Ryckman et al. | |
| 8,543,450 B2 | 9/2013 | Pappas et al. | |
| 8,560,482 B2 | 10/2013 | Miranda et al. | |
| 8,566,880 B2 | 10/2013 | Dunker et al. | |
| 8,600,211 B2 | 12/2013 | Nagano et al. | |
| 8,611,422 B1 | 12/2013 | Yagnik et al. | |
| 8,620,771 B2 | 12/2013 | Pappas et al. | |
| 8,633,964 B1 | 1/2014 | Zhu | |
| 8,650,114 B2 | 2/2014 | Pappas et al. | |
| 8,751,231 B1 | 6/2014 | Larsen et al. | |
| 8,774,604 B2 | 7/2014 | Torii et al. | |
| 8,792,780 B2 | 7/2014 | Hattori | |
| 8,824,863 B2 | 9/2014 | Kitamura et al. | |
| 8,854,457 B2 | 10/2014 | De Vleeschouwer et al. | |
| 8,856,000 B1 | 10/2014 | Larsen et al. | |
| 8,902,282 B1 | 12/2014 | Zhu | |
| 8,909,542 B2 | 12/2014 | Montero et al. | |
| 8,913,103 B1 | 12/2014 | Sargin et al. | |
| 8,918,532 B2 | 12/2014 | Lueth et al. | |
| 8,930,260 B2 | 1/2015 | Pappas et al. | |
| 8,988,528 B2 | 3/2015 | Hikita | |
| 9,009,045 B1 | 4/2015 | Larsen et al. | |
| 9,015,746 B2 | 4/2015 | Holmdahl et al. | |
| 9,026,471 B2 | 5/2015 | Pappas et al. | |
| 9,026,472 B2 | 5/2015 | Pappas et al. | |
| 9,047,634 B2 | 6/2015 | Pappas et al. | |
| 9,064,258 B2 | 6/2015 | Pappas et al. | |
| 9,070,150 B2 | 6/2015 | Pappas et al. | |
| 9,092,813 B2 | 7/2015 | Pappas et al. | |
| 9,106,804 B2 | 8/2015 | Roberts et al. | |
| 9,111,579 B2 | 8/2015 | Meaney et al. | |
| 9,117,201 B2 | 8/2015 | Kennell et al. | |
| 9,129,640 B2 | 9/2015 | Hamer | |
| 9,135,674 B1 | 9/2015 | Yagnik et al. | |
| 9,223,781 B2 | 12/2015 | Pearson et al. | |
| 9,224,156 B2 | 12/2015 | Moorer | |
| 9,305,286 B2 | 4/2016 | Larsen et al. | |
| 9,305,287 B2 | 4/2016 | Krishnamoorthy et al. | |
| 9,355,151 B1 | 5/2016 | Cranfill et al. | |
| 9,378,486 B2 | 6/2016 | Taylor et al. | |
| 9,398,315 B2 | 7/2016 | Oks et al. | |
| 9,402,050 B1 | 7/2016 | Recchia et al. | |
| 9,437,247 B2 | 9/2016 | Pendergast et al. | |
| 9,438,934 B1 | 9/2016 | Zhu | |
| 9,443,556 B2 | 9/2016 | Cordell et al. | |
| 9,456,174 B2 | 9/2016 | Boyle et al. | |
| 9,462,301 B2 | 10/2016 | Paśko | |
| 9,501,663 B1 | 11/2016 | Hopkins, III et al. | |
| 9,501,944 B2 | 11/2016 | Boneta et al. | |
| 9,542,452 B1 | 1/2017 | Ross et al. | |
| 9,544,380 B2 | 1/2017 | Deng et al. | |
| 9,554,160 B2 | 1/2017 | Han et al. | |
| 9,570,107 B2 | 2/2017 | Boiman et al. | |
| 9,583,144 B2 | 2/2017 | Ricciardi | |
| 9,600,723 B1 | 3/2017 | Pantofaru et al. | |
| 9,607,655 B2 | 3/2017 | Bloch et al. | |
| 9,652,745 B2 | 5/2017 | Taylor et al. | |
| 9,653,115 B2 | 5/2017 | Bloch et al. | |
| 9,666,194 B2 | 5/2017 | Ondeck et al. | |
| 9,684,435 B2 | 6/2017 | Carr et al. | |
| 9,693,019 B1 | 6/2017 | Fluhr et al. | |
| 9,710,790 B2 | 7/2017 | Taylor et al. | |
| 9,723,223 B1 | 8/2017 | Banta et al. | |
| 9,747,573 B2 | 8/2017 | Shaburov et al. | |
| 9,792,955 B2 | 10/2017 | Fleischhauer et al. | |
| 9,805,767 B1 | 10/2017 | Strickland | |
| 9,823,809 B2 | 11/2017 | Roos | |
| 9,876,963 B2 | 1/2018 | Nakamura et al. | |
| 9,881,647 B2 | 1/2018 | McCauley et al. | |
| 9,936,185 B2 | 4/2018 | Delvaux et al. | |
| 9,940,508 B2 | 4/2018 | Kaps et al. | |
| 9,940,973 B2 | 4/2018 | Roberts et al. | |
| 9,979,921 B2 | 5/2018 | Holmes | |
| 10,008,239 B2 | 6/2018 | Eris | |
| 10,019,653 B2 | 7/2018 | Wilf et al. | |
| 10,021,377 B2 | 7/2018 | Newton et al. | |
| 10,108,932 B2 | 10/2018 | Sung et al. | |
| 10,115,038 B2 | 10/2018 | Hazur et al. | |
| 10,147,460 B2 | 12/2018 | Ullrich | |
| 10,152,695 B1 | 12/2018 | Chiu et al. | |
| 10,152,696 B2 | 12/2018 | Thankappan et al. | |
| 10,168,866 B2 | 1/2019 | Wakeen et al. | |

(56) References Cited

U.S. PATENT DOCUMENTS

| | | |
|---|---|---|
| 10,178,427 B2 | 1/2019 | Huang |
| 10,235,008 B2 | 3/2019 | Lee et al. |
| 10,242,345 B2 | 3/2019 | Taylor et al. |
| 10,268,736 B1 | 4/2019 | Balasia et al. |
| 10,296,873 B1 | 5/2019 | Balasia et al. |
| 10,310,361 B1 | 6/2019 | Featherstone |
| 10,318,927 B2 | 6/2019 | Champaneria |
| 10,325,243 B1 | 6/2019 | Ross et al. |
| 10,325,517 B2 | 6/2019 | Nielson et al. |
| 10,346,805 B2 | 7/2019 | Taylor et al. |
| 10,346,928 B2 | 7/2019 | Li et al. |
| 10,353,720 B1 | 7/2019 | Wich-Vila |
| 10,433,030 B2 * | 10/2019 | Packard ........... H04N 21/25883 |
| 10,438,135 B2 | 10/2019 | Larsen et al. |
| 10,607,188 B2 | 3/2020 | Kyllonen et al. |
| 10,657,498 B2 | 5/2020 | Dey et al. |
| 10,694,097 B1 | 6/2020 | Shirakyan |
| 10,728,443 B1 | 7/2020 | Olshansky |
| 10,735,396 B2 | 8/2020 | Krstic et al. |
| 10,748,118 B2 | 8/2020 | Fang |
| 10,796,217 B2 | 10/2020 | Wu |
| 10,963,841 B2 | 3/2021 | Olshansky |
| 11,023,735 B1 | 6/2021 | Olshansky |
| 11,127,232 B2 | 9/2021 | Olshansky |
| 2001/0001160 A1 | 5/2001 | Shoff et al. |
| 2001/0038746 A1 | 11/2001 | Hughes et al. |
| 2002/0097984 A1 | 7/2002 | Abecassis |
| 2002/0113879 A1 | 8/2002 | Battle et al. |
| 2002/0122659 A1 | 9/2002 | McGrath et al. |
| 2002/0191071 A1 | 12/2002 | Rui et al. |
| 2003/0005429 A1 | 1/2003 | Colsey |
| 2003/0027611 A1 | 2/2003 | Recard |
| 2003/0189589 A1 | 10/2003 | Leblanc et al. |
| 2003/0194211 A1 | 10/2003 | Abecassis |
| 2004/0033061 A1 | 2/2004 | Hughes et al. |
| 2004/0186743 A1 | 9/2004 | Cordero |
| 2004/0264919 A1 | 12/2004 | Taylor et al. |
| 2005/0095569 A1 | 5/2005 | Franklin |
| 2005/0137896 A1 | 6/2005 | Pentecost et al. |
| 2005/0187765 A1 | 8/2005 | Kim et al. |
| 2005/0232462 A1 | 10/2005 | Vallone et al. |
| 2005/0235033 A1 | 10/2005 | Doherty |
| 2005/0271251 A1 | 12/2005 | Russell et al. |
| 2006/0042483 A1 | 3/2006 | Work et al. |
| 2006/0045179 A1 | 3/2006 | Mizuno et al. |
| 2006/0100919 A1 | 5/2006 | Levine |
| 2006/0116555 A1 | 6/2006 | Pavlidis et al. |
| 2006/0229896 A1 | 10/2006 | Rosen et al. |
| 2007/0088601 A1 | 4/2007 | Money et al. |
| 2007/0124161 A1 | 5/2007 | Mueller et al. |
| 2007/0237502 A1 | 10/2007 | Ryckman et al. |
| 2007/0288245 A1 | 12/2007 | Benjamin |
| 2008/0086504 A1 | 4/2008 | Sanders et al. |
| 2009/0083103 A1 | 3/2009 | Basser |
| 2009/0083670 A1 | 3/2009 | Roos |
| 2009/0087161 A1 | 4/2009 | Roberts et al. |
| 2009/0144785 A1 | 6/2009 | Walker et al. |
| 2009/0171899 A1 | 7/2009 | Chittoor et al. |
| 2009/0248685 A1 | 10/2009 | Pasqualoni et al. |
| 2009/0258334 A1 | 10/2009 | Pyne |
| 2010/0086283 A1 | 4/2010 | Ramachandran et al. |
| 2010/0143329 A1 | 6/2010 | Larsen |
| 2010/0183280 A1 | 7/2010 | Beauregard et al. |
| 2010/0191561 A1 | 7/2010 | Jeng et al. |
| 2010/0199228 A1 | 8/2010 | Latta et al. |
| 2010/0223109 A1 | 9/2010 | Hawn et al. |
| 2010/0325307 A1 | 12/2010 | Roos |
| 2011/0055098 A1 | 3/2011 | Stewart |
| 2011/0055930 A1 | 3/2011 | Flake et al. |
| 2011/0060671 A1 | 3/2011 | Erbey et al. |
| 2011/0076656 A1 | 3/2011 | Scott et al. |
| 2011/0088081 A1 | 4/2011 | Folkesson et al. |
| 2011/0135279 A1 | 6/2011 | Leonard |
| 2012/0036127 A1 | 2/2012 | Work et al. |
| 2012/0053996 A1 | 3/2012 | Galbavy |
| 2012/0084649 A1 | 4/2012 | Dowdell et al. |
| 2012/0114246 A1 | 5/2012 | Weitzman |
| 2012/0130771 A1 | 5/2012 | Kannan et al. |
| 2012/0257875 A1 | 10/2012 | Sharpe et al. |
| 2012/0271774 A1 | 10/2012 | Clegg |
| 2013/0007670 A1 | 1/2013 | Roos |
| 2013/0016815 A1 | 1/2013 | Odinak et al. |
| 2013/0016816 A1 | 1/2013 | Odinak et al. |
| 2013/0016823 A1 | 1/2013 | Odinak et al. |
| 2013/0024105 A1 | 1/2013 | Thomas |
| 2013/0111401 A1 | 5/2013 | Newman et al. |
| 2013/0121668 A1 | 5/2013 | Meaney et al. |
| 2013/0124998 A1 | 5/2013 | Pendergast et al. |
| 2013/0124999 A1 | 5/2013 | Agnoli et al. |
| 2013/0125000 A1 | 5/2013 | Fleischhauer et al. |
| 2013/0177296 A1 | 7/2013 | Geisner et al. |
| 2013/0212033 A1 | 8/2013 | Work et al. |
| 2013/0212180 A1 | 8/2013 | Work et al. |
| 2013/0216206 A1 | 8/2013 | Dubin et al. |
| 2013/0218688 A1 | 8/2013 | Roos |
| 2013/0222601 A1 | 8/2013 | Engstrom et al. |
| 2013/0226578 A1 | 8/2013 | Bolton et al. |
| 2013/0226674 A1 | 8/2013 | Field et al. |
| 2013/0226910 A1 | 8/2013 | Work et al. |
| 2013/0254192 A1 | 9/2013 | Work et al. |
| 2013/0259447 A1 | 10/2013 | Sathish et al. |
| 2013/0266925 A1 | 10/2013 | Nunamaker, Jr. et al. |
| 2013/0268452 A1 | 10/2013 | MacEwen et al. |
| 2013/0283378 A1 | 10/2013 | Costigan et al. |
| 2013/0290210 A1 | 10/2013 | Cline et al. |
| 2013/0290325 A1 | 10/2013 | Work et al. |
| 2013/0290420 A1 | 10/2013 | Work et al. |
| 2013/0290448 A1 | 10/2013 | Work et al. |
| 2013/0297589 A1 | 11/2013 | Work et al. |
| 2013/0332381 A1 | 12/2013 | Clark et al. |
| 2013/0332382 A1 | 12/2013 | Lapasta et al. |
| 2014/0036023 A1 | 2/2014 | Croen et al. |
| 2014/0089217 A1 | 3/2014 | McGovern et al. |
| 2014/0092254 A1 | 4/2014 | Mughal et al. |
| 2014/0123177 A1 | 5/2014 | Kim et al. |
| 2014/0125703 A1 | 5/2014 | Roveta et al. |
| 2014/0143165 A1 | 5/2014 | Posse et al. |
| 2014/0153902 A1 | 6/2014 | Pearson et al. |
| 2014/0186004 A1 | 7/2014 | Hamer |
| 2014/0191939 A1 | 7/2014 | Penn et al. |
| 2014/0192200 A1 | 7/2014 | Zagron |
| 2014/0198196 A1 | 7/2014 | Howard et al. |
| 2014/0214709 A1 | 7/2014 | Greaney |
| 2014/0245146 A1 | 8/2014 | Roos |
| 2014/0258288 A1 | 9/2014 | Work et al. |
| 2014/0270706 A1 | 9/2014 | Pasko |
| 2014/0278506 A1 | 9/2014 | Rogers et al. |
| 2014/0278683 A1 | 9/2014 | Kennell et al. |
| 2014/0279634 A1 | 9/2014 | Seeker |
| 2014/0282709 A1 | 9/2014 | Hardy et al. |
| 2014/0317009 A1 | 10/2014 | Bilodeau et al. |
| 2014/0317126 A1 | 10/2014 | Work et al. |
| 2014/0325359 A1 | 10/2014 | Vehovsky et al. |
| 2014/0325373 A1 | 10/2014 | Kramer et al. |
| 2014/0327779 A1 | 11/2014 | Eronen et al. |
| 2014/0330734 A1 | 11/2014 | Sung et al. |
| 2014/0336942 A1 | 11/2014 | Pe'er et al. |
| 2014/0337900 A1 | 11/2014 | Hurley |
| 2014/0356822 A1 | 12/2014 | Hoque et al. |
| 2014/0358810 A1 | 12/2014 | Hardtke et al. |
| 2014/0359439 A1 | 12/2014 | Lyren |
| 2015/0003603 A1 | 1/2015 | Odinak et al. |
| 2015/0003605 A1 | 1/2015 | Odinak et al. |
| 2015/0006422 A1 | 1/2015 | Carter et al. |
| 2015/0012453 A1 | 1/2015 | Odinak et al. |
| 2015/0046357 A1 | 2/2015 | Danson et al. |
| 2015/0063775 A1 | 3/2015 | Nakamura et al. |
| 2015/0067723 A1 | 3/2015 | Bloch et al. |
| 2015/0099255 A1 | 4/2015 | Aslan et al. |
| 2015/0100702 A1 | 4/2015 | Krishna et al. |
| 2015/0127565 A1 | 5/2015 | Chevalier et al. |
| 2015/0139601 A1 | 5/2015 | Mate et al. |
| 2015/0154564 A1 | 6/2015 | Moon et al. |
| 2015/0155001 A1 | 6/2015 | Kikugawa et al. |

(56) References Cited

U.S. PATENT DOCUMENTS

| | | |
|---|---|---|
| 2015/0170303 A1 | 6/2015 | Geritz et al. |
| 2015/0201134 A1 | 7/2015 | Carr et al. |
| 2015/0205800 A1 | 7/2015 | Work et al. |
| 2015/0205872 A1 | 7/2015 | Work et al. |
| 2015/0206102 A1 | 7/2015 | Cama et al. |
| 2015/0222815 A1 | 8/2015 | Wang et al. |
| 2015/0228306 A1 | 8/2015 | Roberts et al. |
| 2015/0242707 A1 | 8/2015 | Wilf et al. |
| 2015/0269165 A1 | 9/2015 | Work et al. |
| 2015/0269529 A1 | 9/2015 | Kyllonen et al. |
| 2015/0269530 A1 | 9/2015 | Work et al. |
| 2015/0271289 A1 | 9/2015 | Work et al. |
| 2015/0278223 A1 | 10/2015 | Work et al. |
| 2015/0278290 A1 | 10/2015 | Work et al. |
| 2015/0278964 A1 | 10/2015 | Work et al. |
| 2015/0324698 A1 | 11/2015 | Karaoguz et al. |
| 2015/0339939 A1 | 11/2015 | Gustafson et al. |
| 2015/0356512 A1 | 12/2015 | Bradley |
| 2015/0380052 A1 | 12/2015 | Hamer |
| 2016/0005029 A1 | 1/2016 | Ivey et al. |
| 2016/0036976 A1 | 2/2016 | Odinak et al. |
| 2016/0104096 A1 | 4/2016 | Ovick et al. |
| 2016/0116827 A1 | 4/2016 | Tarres Bolos |
| 2016/0117942 A1 | 4/2016 | Marino et al. |
| 2016/0139562 A1 | 5/2016 | Crowder et al. |
| 2016/0154883 A1 | 6/2016 | Boerner |
| 2016/0155475 A1 | 6/2016 | Hamer |
| 2016/0180234 A1 | 6/2016 | Siebach et al. |
| 2016/0180883 A1 | 6/2016 | Hamer |
| 2016/0219264 A1 | 7/2016 | Delvaux et al. |
| 2016/0225409 A1 | 8/2016 | Eris |
| 2016/0225410 A1 | 8/2016 | Lee et al. |
| 2016/0247537 A1 | 8/2016 | Ricciardi |
| 2016/0267436 A1 | 9/2016 | Silber et al. |
| 2016/0313892 A1 | 10/2016 | Roos |
| 2016/0323608 A1 | 11/2016 | Bloch et al. |
| 2016/0330398 A1 | 11/2016 | Recchia et al. |
| 2016/0364692 A1 | 12/2016 | Bhaskaran et al. |
| 2017/0026667 A1 | 1/2017 | Pasko |
| 2017/0039525 A1 | 2/2017 | Seidle et al. |
| 2017/0076751 A9 | 3/2017 | Hamer |
| 2017/0134776 A1 | 5/2017 | Ranjeet et al. |
| 2017/0164013 A1 | 6/2017 | Abramov et al. |
| 2017/0164014 A1 | 6/2017 | Abramov et al. |
| 2017/0164015 A1 | 6/2017 | Abramov et al. |
| 2017/0171602 A1 | 6/2017 | Qu |
| 2017/0178688 A1 | 6/2017 | Ricciardi |
| 2017/0195491 A1 | 7/2017 | Odinak et al. |
| 2017/0206504 A1 | 7/2017 | Taylor et al. |
| 2017/0213190 A1 | 7/2017 | Hazan |
| 2017/0213573 A1 | 7/2017 | Takeshita et al. |
| 2017/0227353 A1 | 8/2017 | Brunner |
| 2017/0236073 A1 | 8/2017 | Borisyuk et al. |
| 2017/0244894 A1 | 8/2017 | Aggarwal et al. |
| 2017/0244984 A1 | 8/2017 | Aggarwal et al. |
| 2017/0244991 A1 | 8/2017 | Aggarwal et al. |
| 2017/0262706 A1 | 9/2017 | Sun et al. |
| 2017/0264958 A1 | 9/2017 | Hutten |
| 2017/0293413 A1 | 10/2017 | Matsushita et al. |
| 2017/0316806 A1 | 11/2017 | Warren et al. |
| 2017/0332044 A1 | 11/2017 | Marlow et al. |
| 2017/0353769 A1 | 12/2017 | Husain et al. |
| 2017/0372748 A1 | 12/2017 | McCauley et al. |
| 2018/0011621 A1 | 1/2018 | Roos |
| 2018/0025303 A1 | 1/2018 | Janz |
| 2018/0054641 A1 | 2/2018 | Hall et al. |
| 2018/0070045 A1 | 3/2018 | Holmes |
| 2018/0074681 A1 | 3/2018 | Roos |
| 2018/0082238 A1 | 3/2018 | Shani |
| 2018/0096307 A1 | 4/2018 | Fortier et al. |
| 2018/0109737 A1 | 4/2018 | Nakamura et al. |
| 2018/0109826 A1 | 4/2018 | McCoy et al. |
| 2018/0110460 A1 | 4/2018 | Danson et al. |
| 2018/0114154 A1 | 4/2018 | Bae |
| 2018/0130497 A1 | 5/2018 | McCauley et al. |
| 2018/0132014 A1 | 5/2018 | Khazanov et al. |
| 2018/0150604 A1 | 5/2018 | Arena et al. |
| 2018/0158027 A1 | 6/2018 | Venigalla |
| 2018/0182436 A1 | 6/2018 | Ullrich |
| 2018/0191955 A1 | 7/2018 | Aoki et al. |
| 2018/0218238 A1 | 8/2018 | Viirre et al. |
| 2018/0226102 A1 | 8/2018 | Roberts et al. |
| 2018/0227501 A1 | 8/2018 | King |
| 2018/0232751 A1 | 8/2018 | Terhark et al. |
| 2018/0247271 A1 | 8/2018 | Van Hoang et al. |
| 2018/0253697 A1 | 9/2018 | Sung et al. |
| 2018/0268868 A1 | 9/2018 | Salokannel et al. |
| 2018/0270613 A1 | 9/2018 | Park |
| 2018/0302680 A1 | 10/2018 | Cormican |
| 2018/0308521 A1 | 10/2018 | Iwamoto |
| 2018/0316947 A1 | 11/2018 | Todd |
| 2018/0336528 A1 | 11/2018 | Carpenter et al. |
| 2018/0336930 A1 | 11/2018 | Takahashi |
| 2018/0350405 A1 | 12/2018 | Marco et al. |
| 2018/0353769 A1 | 12/2018 | Smith et al. |
| 2018/0374251 A1 | 12/2018 | Mitchell et al. |
| 2018/0376225 A1 | 12/2018 | Jones et al. |
| 2019/0005373 A1 | 1/2019 | Nims et al. |
| 2019/0019157 A1 | 1/2019 | Saha et al. |
| 2019/0057356 A1 | 2/2019 | Larsen et al. |
| 2019/0087558 A1 | 3/2019 | Mercury et al. |
| 2019/0096307 A1 | 3/2019 | Liang et al. |
| 2019/0141033 A1 | 5/2019 | Kaafar et al. |
| 2019/0220824 A1 | 7/2019 | Liu |
| 2019/0244176 A1 | 8/2019 | Chuang et al. |
| 2019/0259002 A1 | 8/2019 | Balasia et al. |
| 2019/0295040 A1 | 9/2019 | Clines |
| 2019/0311488 A1 | 10/2019 | Sareen |
| 2019/0325064 A1 | 10/2019 | Mathiesen et al. |
| 2020/0012350 A1 | 1/2020 | Tay |
| 2020/0110786 A1 | 4/2020 | Kim |
| 2020/0126545 A1 | 4/2020 | Kakkar et al. |
| 2020/0143329 A1 | 5/2020 | Gamaliel |
| 2020/0311163 A1 | 10/2020 | Ma et al. |
| 2020/0311682 A1 | 10/2020 | Olshansky |
| 2020/0311953 A1 | 10/2020 | Olshansky |
| 2020/0396376 A1 | 12/2020 | Olshansky |
| 2021/0035047 A1 | 2/2021 | Mossoba et al. |
| 2021/0174308 A1 | 6/2021 | Olshansky |
| 2021/0233262 A1 | 7/2021 | Olshansky |

FOREIGN PATENT DOCUMENTS

| | | |
|---|---|---|
| CA | 2763634 | 12/2012 |
| CN | 109146430 | 1/2019 |
| EP | 1376584 | 1/2004 |
| EP | 1566748 | 8/2005 |
| EP | 1775949 | 12/2007 |
| EP | 1954041 | 8/2008 |
| JP | 2009258175 | 11/2009 |
| JP | 2019016192 | 1/2019 |
| WO | 2007097218 | 0/8200 |
| WO | 9703366 | 1/1997 |
| WO | 9713366 | 4/1997 |
| WO | 9713367 | 10/1997 |
| WO | 9828908 | 7/1998 |
| WO | 9841978 | 9/1998 |
| WO | 9905865 | 2/1999 |
| WO | 0133421 | 5/2001 |
| WO | 0117250 | 9/2002 |
| WO | 03003725 | 1/2003 |
| WO | 2004062563 | 7/2004 |
| WO | 2005114377 | 12/2005 |
| WO | 2006103578 | 10/2006 |
| WO | 2006129496 | 12/2006 |
| WO | 2007039994 | 4/2007 |
| WO | 2008029803 | 3/2008 |
| WO | 2008039407 | 4/2008 |
| WO | 2009042858 | 4/2009 |
| WO | 2009042900 | 4/2009 |
| WO | 2009075190 | 6/2009 |
| WO | 2009116955 | 9/2009 |
| WO | 2009157446 | 12/2009 |
| WO | 2010055624 | 5/2010 |

(56) References Cited

FOREIGN PATENT DOCUMENTS

| | | |
|---|---|---|
| WO | 2010116998 | 10/2010 |
| WO | 2011001180 | 1/2011 |
| WO | 2011007011 | 1/2011 |
| WO | 2011035419 | 3/2011 |
| WO | 2011129578 | 10/2011 |
| WO | 2011136571 | 11/2011 |
| WO | 2012002896 | 1/2012 |
| WO | 2012068433 | 5/2012 |
| WO | 2012039959 | 6/2012 |
| WO | 2012089855 | 7/2012 |
| WO | 2013026095 | 2/2013 |
| WO | 2013039351 | 3/2013 |
| WO | 2013074207 | 5/2013 |
| WO | 2013088208 | 6/2013 |
| WO | 2013093176 | 6/2013 |
| WO | 2013131134 | 9/2013 |
| WO | 2013165923 | 11/2013 |
| WO | 2014089362 | 6/2014 |
| WO | 2014093668 | 6/2014 |
| WO | 2014152021 | 9/2014 |
| WO | 2014163283 | 10/2014 |
| WO | 2014164549 | 10/2014 |
| WO | 2015031946 | 4/2015 |
| WO | 2015071490 | 5/2015 |
| WO | 2015109290 | 7/2015 |
| WO | 2016031431 | 3/2016 |
| WO | 2016053522 | 4/2016 |
| WO | 2016073206 | 5/2016 |
| WO | 2016123057 | 8/2016 |
| WO | 2016138121 | 9/2016 |
| WO | 2016138161 | 9/2016 |
| WO | 2016186798 | 11/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017096271 | 6/2017 |
| WO | 2017130810 | 8/2017 |
| WO | 2017150772 | 9/2017 |
| WO | 2017192125 | 11/2017 |
| WO | 2018042175 | 3/2018 |
| WO | 2018094443 | 5/2018 |
| WO | 2020198230 | 10/2020 |
| WO | 2020198240 | 10/2020 |
| WO | 2020198363 | 10/2020 |
| WO | 2021108564 | 6/2021 |

OTHER PUBLICATIONS

"Air Canada Keeping Your Points Active Aeroplan," https://www.aircanada.com/us/en/aco/home/aeroplan/your-aeroplan/inactivity-policy.html, 6 pages.

Alley, E., "Professional Autonomy in Video Relay Service Interpreting: Perceptions of American Sign Language—English Interpreters" (Order No. 10304259) Available from ProQuest Dissertations and Theses Professional. (Year: 2016), 209 pages.

"American Express Frequently Asked Question: Why were Membersip Rewards points forfeited and how can I reinstate them?," https://www.americanexpress.com/us/customer-service/faq.membership-rewards-points-forfeiture.html, 2 pages.

Brocardo, Marcelo L. et al., "Verifying Online User Identity using Stylometric Analysis for Short Messages," Journal of Networks, vol. 9, No. 12, Dec. 2014, pp. 3347-3355.

File History for U.S. Appl. No. 16/366,746 downloaded May 10, 2021 (328 pages).

File History for U.S. Appl. No. 16/828,578 downloaded May 10, 2021 (352 pages).

File History for U.S. Appl. No. 16/366,703 downloaded May 10, 2021 (664 pages).

File History for U.S. Appl. No. 16/696,781 downloaded May 10, 2021 (379 pages).

File History for U.S. Appl. No. 17/025,902 downloaded May 11, 2021 (341 pages).

File History for U.S. Appl. No. 16/931,964 downloaded May 10, 2021 (406 pages).

Hughes, K., "Corporate Channels: How American Business and Industry made Television Useful" (order No. 1086420) Available from ProQuest Dissertations and Theses Professional. (Year: 2015) 499 pages.

"International Search Report and Written Opinion," for PCT Application No. PCT/US2020/024470 dated Jul. 9, 2020 (13 pages).

"International Search Report and Written Opinion," for PCT Application No. PCT/US2020/024488 dated May 19, 2020 (14 pages).

"International Search Report and Written Opinion," for PCT Application No. PCT/US2020/024722 dated Jul. 10, 2020 (13 pages).

"International Search Report and Written Opinion," for PCT Application No. PCT/US2020/062246 dated Apr. 1, 2021 (18 pages).

"Invitation to Pay Additional Fees," for PCT Application No. PCT/US2020/062246 dated Feb. 11, 2021 (14 pages).

Johnston, A.M., et al., "A Mediated Discourse Analysis of Immigration Gatekeeping Interviews" (Order No. 3093235) Available from ProQuest Dissertations and Theses Professional (Year: 2003) 262 pages.

"Nurse Resumes," Post Job Free Resume Search Results for "nurse" available at URL <https://www.postjobfree.com/resumes?q=nurse&l=&radius=25> at least as early as Jan. 26, 2021 (2 pages).

"Nurse," LiveCareer Resume Search results available online at URL <https://www.livecareer.com/resume-search/search?jt=nurse> website published as early as Dec. 21, 2017 (4 pages).

Pentland, S.J., "Human-Analytics in Informations S'ystems Research and Applications in Personnel Selection" (Order No. 10829600) Available from ProQuest Dissertations and Theses Professional. (Year: 2018) 158 pages.

Ramanarayanan, Vikram et al., "Evaluating Speech, Face, Emotion and Body Movement Time-series Features for Automated Multimodal Presentation Scoring," In Proceedings of the 2015 ACM on (ICMI 2015). Association for Computing Machinery, New York, NY, USA, 23-30 (8 pages).

"Resume Database," Mighty Recruiter Resume Database available online at URL <https://www.mightyrecruiter.com/features/resume-database> at least as early as Sep. 4, 2017 (6 pages).

"Resume Library," Online job board available at Resume-library.com at least as early as Aug. 6, 2019 (6 pages).

Swanepoel, De Wet, et al., "A Systematic Review of Telehealth Applications in Audiology" Telemedicine and e-Health 16.2 (2010): 181-200 (20 pages).

"Understanding Multi-Dimensionality in Vector Space Modeling," Pythonic Excursions article published Apr. 16, 2019, accessible at URL <https://aegis4048.github.io/understanding_multi-dimensionality_in_vector_space_modeling> (29 pages).

Wang, Jenny "How to Build a Resume Recommender like the Applicant Tracking System (ATS)," Towards Data Science article published Jun. 25, 2020, accessible at URL <https://towardsdatascience.com/resume-screening-tool-resume-recommendation-engine-in-a-nutshell-53fcf6e6559b> (14 pages).

"International Search Report and Written Opinion," for PCT Application No. PCT/US2021/024423 dated Jun. 16, 2021 (13 pages).

"International Search Report and Written Opinion," for PCT Application No. PCT/US2021/024450 dated Jun. 4, 2021 (14 pages).

"Non-Final Office Action," for U.S. Appl. No. 16/910,986 dated Jun. 23, 2021 (70 pages).

"Notice of Allowance," for U.S. Appl. No. 16/696,781 dated May 17, 2021 (20 pages).

"Television Studio," Wikipedia, Published Mar. 8, 2019 and retrieved May 27, 2021 from URL <https://en.wikipedia.org/w/index/php?title=Television_studio&oldid=886710983> (3 pages).

\* cited by examiner

AUDIO AND VIDEO RECORDING AND STREAMING IN A THREE-COMPUTER BOOTH

CROSS-REFERENCE TO RELATED CASES

This application claims the benefit of U.S. Provisional Patent Application No. 63/004,329, filed on Apr. 2, 2020. This application is related to U.S. patent application Ser. No. 16/828,578, filed on Mar. 24, 2020, which claims the benefit of U.S. Provisional Application No. 62/824,755, filed Mar. 27, 2019. This application is also related to U.S. patent application Ser. No. 16/366,746, filed on Mar. 27, 2019, and U.S. patent application Ser. No. 16/366,702, filed on Mar. 27, 2019, and U.S. patent application Ser. No. 16/696,781, filed on Nov. 27, 2019. Each of these related applications are hereby incorporated by reference in their entireties.

FIELD OF THE TECHNOLOGY

The present invention relates to a video booth or kiosk used to record audio, video, and movements of an individual within the kiosk. More particularly, the kiosk utilizes separate computers to record synchronized audio and video data, store that data separately at the kiosk, and stream that data in separate data streams for recombination at a remote user computer.

SUMMARY OF THE INVENTION

Various embodiments provide a booth for audiovisual recording of an individual is included having a) an enclosing wall forming a perimeter of the booth and defining a booth interior, b) a first camera for taking video images aimed proximally toward the individual in the booth interior, c) a first microphone for receiving audio in the booth interior, d) a video computer located at the booth, the video computer recording the video images received from the first camera so as to be able to identify a plurality of first camera video segments, wherein the plurality of first camera video segments correspond temporally to a plurality of time segments, e) an audio computer located at the booth, the audio computer recording the audio received from the first microphone so as to be able to identify a plurality of first microphone audio segments, wherein the plurality of first microphone audio segments correspond temporally to the plurality of time segments, f) a controller computer located at the booth, the controller computer: i) managing a plurality of versions of an audiovisual presentation, each version identifying a subset of the plurality of time segments, wherein the subset of the plurality of time segments varies between the plurality of versions of the audiovisual presentation, ii) receiving a request from a user computer, the request including user information, iii) choosing a selected version of the audiovisual presentation based on the user information, iv) identifying the subset of time segments for the selected version of the audiovisual presentation as a selected set of time segments, v) instructing the video computer to send a video stream to the user computer, the video stream can include camera video segments corresponding to the selected set of time segments, vi) instructing the audio computer to send an audio stream to the user computer, the audio stream can include microphone audio segments corresponding to the selected set of time segments, and vii) sending presentation instructions to the user computer instructing the user computer to combine the received video stream from the video computer and the received audio stream from the audio computer into a presented version of the audiovisual presentation.

In an embodiment, the booth can further include a second camera for taking video images aimed proximally toward the individual in the booth interior, further can include the video computer recording the video images received from the second camera and identifying a plurality of second camera video segments, wherein the plurality of second camera video segments correspond temporally to the plurality of time segments, still further wherein the video stream includes first camera video segments and second camera video segments.

In an embodiment, a preferred video segment is selected between the first camera video segments and the second camera video segment for each of the plurality of time segments, further wherein the video stream utilizes the preferred video segment for each of the selected set of time segments.

In an embodiment, the booth can further include a second microphone for receiving sound in the booth interior, the booth can further include the audio computer recording the audio received from the second microphone and identifying a plurality of second microphone audio segments, wherein the plurality of second microphone audio segments correspond temporally to the plurality of time segments, and still further wherein the audio stream includes first microphone audio segments and second microphone audio segments.

In an embodiment, a preferred video segment is selected between the first camera video segments and the second camera video segment for each of the plurality of time segments, further wherein a preferred audio segment is selected between the first microphone audio segments and the second microphone audio segment for each of the plurality of time segments, further wherein the video stream utilizes the preferred video segment for each of the selected set of time segments, and further wherein the audio stream utilizes the preferred audio segment for each of the selected set of time segments.

In an embodiment, the presentation instructions further include augmentations that augment one of the video and audio streams, wherein the presented version of the audiovisual presentation includes the augmentations.

In an embodiment, the augmentation includes textual information that is superimposed onto a visual portion of the presented version of the audiovisual presentation.

In an embodiment, the booth can further include the controller computer providing a plurality of individual instructions to the individual in the booth interior, further wherein each individual instruction is provided at a known instruction time.

In an embodiment, the booth can further include a video display located in the booth interior, and wherein the plurality of individual instructions are provided to the user over a user interface on the video display.

In an embodiment, the plurality of time segments are demarcated from each other in part according to the known instruction times.

In an embodiment, the plurality of individual instructions include a plurality of questions for the individual, further wherein the presentation instructions include textual information identifying the questions presented, wherein the presented version of the audiovisual presentation superimposes the textual information onto a visual portion of the presented version of the audiovisual presentation.

In an embodiment, a first version of the plurality of versions includes time segments relating to different set of questions than a second version.

In an embodiment, the video computer, the audio computer, and the controller computer are all mounted on the enclosing wall of the booth.

In an embodiment, the plurality of versions of the audiovisual presentations are created according to rules that, based on the user information, select the selected set of time segments.

In an embodiment, the user information identifies a role for the user computer, wherein the rules select the selected set of time segments based on the role.

In an embodiment, the booth can further include a depth sensor for detecting movements of the individual in the interior of the booth, wherein the presentation instructions further include augmentations derived from the detected movements of the individual by the depth sensor, wherein the presented version of the audiovisual presentation includes the augmentations.

In an embodiment, the booth can further include an input device that receives physical inputs from the individual, wherein the presentation instructions further include augmentations derived from the physical inputs received on the input device, wherein the presented version of the audiovisual presentation includes the augmentations.

In an embodiment, the booth can further include a remote server system in communication with the controller computer, wherein the remote server system processes search requests from the user computer and assists the user computer in directing the request to the controller computer.

In an embodiment, personally identifiable information concerning the user is permanently stored at the server system and personally identifiable information concerning the user is not permanently stored at the booth.

In an embodiment, a method is included, the method can include a) recording, on a video computer local to a booth, first video data received from a first camera mounted in an interior of the booth, the first video data being recorded during a first session recording an individual within the booth, b) recording, on the video computer and during the first session, second video data received from a second camera mounted in the interior of the booth, c) recording, on an audio computer local to the booth and during the first session, first audio data received from a first microphone mounted in the interior of the booth, d) determining a plurality of time segments for the first session and dividing the first video data, the second video data, and the first audio data into segments that temporally correspond to the plurality of time segments, e) identifying a preferred video segment for each of the plurality of time segments from between the segments of the first video data the segments of the second video data, f) managing, at a controller computer local to the booth, a plurality of versions of an audiovisual presentation, each version identifying a subset of the plurality of time segments, wherein the subset of the plurality of time segments varies between the plurality of versions of the audiovisual presentation g) receiving, at the controller computer local to the booth, a request from a user computer, the request including user information, h) identifying, at the controller computer, a selected subset of the plurality of time segments for the user computer based on the user information, i) sending, from the controller computer, instructions to the video computer to send a video stream to the user computer, the video stream can include the preferred video segments corresponding to the selected subset of the plurality of time segments, wherein the video stream includes segments from the first video data and segments from the second video data, j) sending, from the controller computer, instructions to the audio computer to send an audio stream to the user computer, the audio stream can include segments of the first audio data corresponding to the selected subset of the plurality of time segments, and k) sending, from the controller computer, presentation instructions to the user computer instructing the user computer to combine the received video stream from the video computer and the received audio stream from the audio computer into a presented version of the audiovisual presentation.

In an embodiment, a method is included, the method can include a) recording, on a booth computer local to a booth, first video data received from a first camera mounted in an interior of the booth, the first video data being recorded during a first session recording an individual within the booth, b) recording, on the booth computer and during the first session, second video data received from a second camera mounted in the interior of the booth, c) recording, on the booth computer and during the first session, first audio data received from a first microphone mounted in the interior of the booth, d) determining a plurality of time segments for the first session and dividing the first video data, the second video data, and the first audio data into segments that temporally correspond to the plurality of time segments, e) identifying a preferred video segment for each of the plurality of time segments from between the segments of the first video data the segments of the second video data, f) managing, at the booth computer, a plurality of versions of an audiovisual presentation, each version identifying a subset of the plurality of time segments, wherein the subset of the plurality of time segments varies between the plurality of versions of the audiovisual presentation g) receiving, at the booth computer, a request from a user computer, the request including user information, h) identifying, at the booth computer, a selected subset of the plurality of time segments for the user computer based on the user information, i) sending, from the booth computer, a video stream to the user computer, the video stream can include the preferred video segments corresponding to the selected subset of the plurality of time segments, wherein the video stream includes segments from the first video data and segments from the second video data, j) sending, from the booth computer, an audio stream to the user computer, the audio stream can include segments of the first audio data corresponding to the selected subset of the plurality of time segments, and k) sending, from the booth computer, presentation instructions to the user computer instructing the user computer to combine the received video stream and the received audio stream into a presented version of the audiovisual presentation.

DETAILED DESCRIPTION

Kiosk 100 and Components

Figure 1:
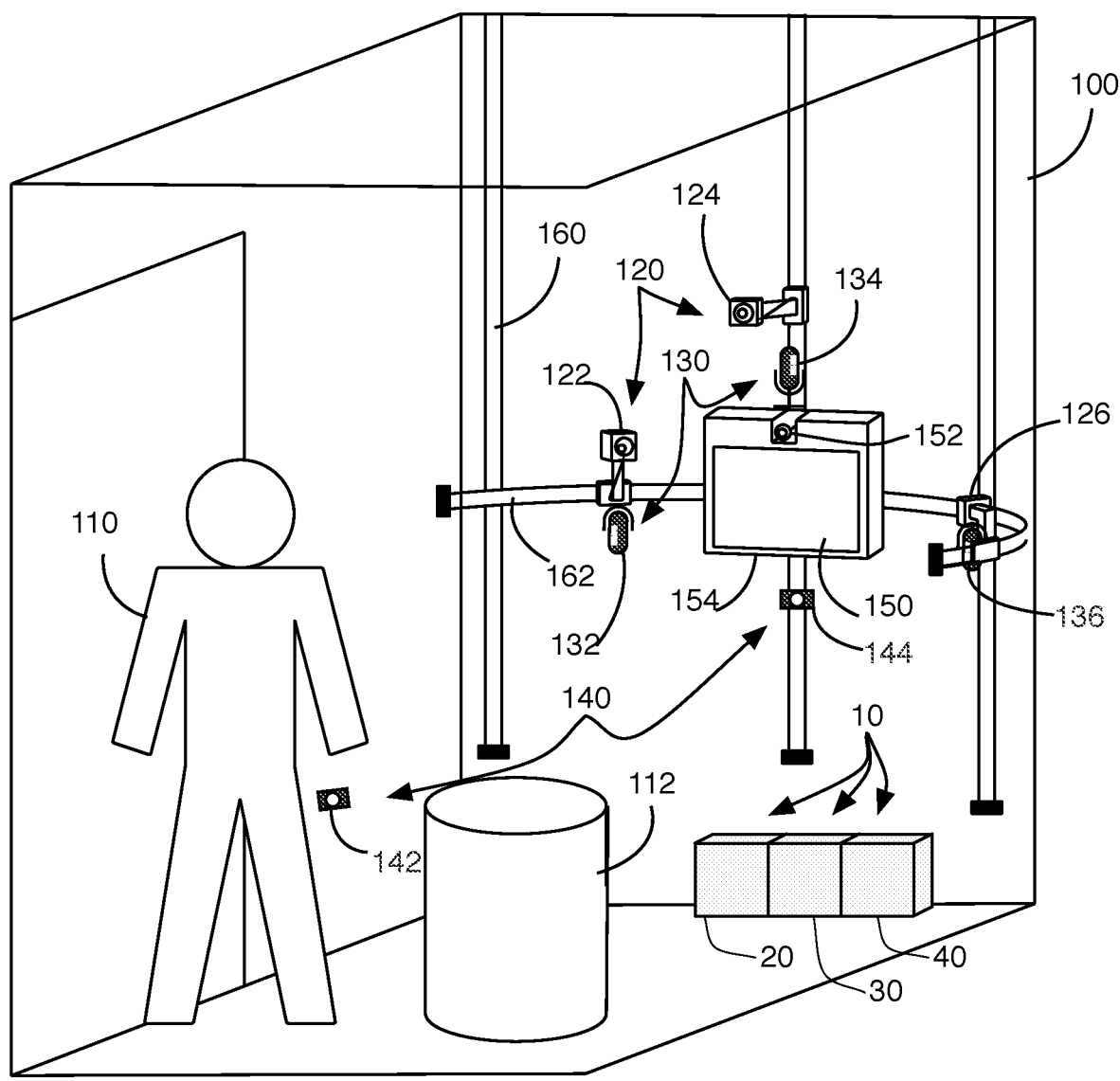
FIG. 1 is a schematic, isometric view of an embodiment of a kiosk having cameras, microphones, and depth sensors to record an individual in a recording session.

FIG. 1 shows a booth or kiosk 100. The kiosk 100 is designed to record audio created by an individual 110 within the kiosk 100, while also recording their movements by taking video and depth-sensor data of that individual 110. The kiosk 100 is preferably an enclosed room that may or may not have a roof. In some examples, the kiosk 100 includes soundproofing in its walls, allowing the kiosk 100 to be placed in a noisy setting. In a preferred embodiment, the kiosk 100 is configured to record the individual 110 when they are seated upon a seat 112 located in the interior of the kiosk 100.

The recording of the individual 110 is preferably under the control of a plurality of computers 10, such as computers 20, 30, and 40. The computers 10 are incorporated within or are in physical connection with the kiosk 100. In some examples, the computers 10 can be located within the seat 112. In other examples, the computers 10 can be located somewhere in the interior of the booth 100, such as adjacent to a wall (as shown in FIG. 1). It is also possible for the computers 10 to be located outside the booth 100 but close enough to maintain a local, physical connection with the booth 100. For example, the computers 10 could be located on the roof of the booth 100. Other embodiments embed the computers within the walls or ceiling of the booth 100. The local, physical connection between the computers 10 and the kiosk 100 between does not include connection over a wide area network such as the Internet. Wide area connections would cause obvious problems such as data transmission delays, but most importantly it destroys the benefit of having multiple, local computers associated with each kiosk 100 in a system comprising a plurality of kiosks.

Each computer 10 is a computing device that includes a processor for processing computer programming instructions. In most cases, the processor is a CPU, such as the CPU devices created by Intel Corporation (Santa Clara, Calif.), Advanced Micro Devices, Inc (Santa Clara, Calif.), or a RISC processer produced according to the designs of Arm Holdings PLC (Cambridge, England). Furthermore, each computer 10 has memory, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data will be stored permanently on non-transitory storage devices and transferred into RAM when needed for processing or analysis. In some embodiments, one or more computers 10 may include a graphics processing unit (or GPU) for enhanced processing of video input and outputs. Another of the computers 10 may include an additional audio processing board, a single chip audio processor, or a digital signal processor (or DSP) that accelerates the processing of audio inputs and outputs.

The kiosk 100 houses multiple video cameras 120, including a first camera 122, a second camera 124, and a third camera 126. Each of the cameras 120 is capable of recording video of the individual 110 from different angles. In the example of FIG. 1, the first camera 122 records the individual 110 from the left side, the second camera 124 records the individual 110 from the center, and the third camera 126 records the individual 110 from the right side. The cameras 120 can be digital video cameras that record video in the visible spectrum using, for example, a CCD or CMOS image sensor.

The kiosk 100 also houses at least one microphone 130 for recording audio. In FIG. 1, three microphones 132, 134, 136 are shown in the kiosk 100, with each microphone 132, 134, 136 being located in relatively close proximity to one of the three cameras 122, 124, 126. In some embodiments, the microphones 130 are embedded into and form part of the same physical component as the camera 120.

Furthermore, the kiosk 100 incorporates at least one depth sensor 140 that can detect changes in the position of the individual 110. In FIG. 1, a first depth sensor 142 is positioned to the left side of the individual 110 when the individual is seated on the seat 112, with a second depth sensor 144 being located to the front of the individual. In some examples, the depth sensors 140 can incorporate a stereoscopic optical depth sensor, an infrared sensor, a laser sensor, or a LIDAR sensor. In some examples, the booth 100 can include a combination of different types of depth sensors 140. These sensors 140 generate information about the facial expression, body movement, body posture, and hand gestures of an individual.

As explained in the incorporated patent application Ser. No. 16/366,703, information from special behavioral sensors 140 can be combined with information obtained from video cameras 120 and microphones 130 to provide even more detailed behavioral data. This information can then be used to extrapolate information about the individual's emotional state during their interactions in the booth 100, such as whether the individual 110 was calm or nervous, or whether the individual 110 was speaking passionately about a particular subject.

The computers 10 are tasked with receiving and storing the raw video data from the cameras 120, the raw audio data from the microphones 130, and the raw sensor data from the behavioral depth sensors 140. To save storage space, audio and video compression formats can be utilized. These can include but are not limited to, H.264, AVC, MPEG-4 Video, MP3, AAC, ALAC, and Windows Media Audio. Note that many of the video formats encode both visual and audio data. To the extent the microphones 130 are integrated into the cameras 120, the received audio and video data from a single integrated device can be stored as a single file. However, in the preferred embodiment, audio data is received by a separate computer 10 than the video data. For example, computer 30 may be the audio computer, designed to receive and separately store audio data from the microphones 130, while computer 40 may be the video camera, designed to receive and separately store the video data from the video cameras 120.

The kiosk 100 also includes one or more user interfaces 150. User interface 150 is shown as a display screen that can display content and images to the individual 110. In some examples, an additional camera 152 can be integrated into the user interface 150. When these elements 150, 152 are integrated together, both can form, for example, different parts of a single tablet computer 154. Alternatively, the user interface 150 can take the form of a touchscreen operated by one of the computers 10. Even when the user interface 150 forms part of a tablet computer 154, the tablet computer 154 can receive instructions from, and provide data to, the computers 10. The user interface 150 can prompt the individual to answer interview questions, show a recorded or live video (including a live video of the user 110 themselves), or prompt the individual 110 to demonstrate a skill or talent.

In some examples, the various pieces of hardware can be mounted to the walls of the booth 100 on a vertical support 160 and/or a horizontal support 162. The vertical support 160 can be used to adjust the vertical height of the cameras 120, microphones 130, depth sensors 140, and the user interface 150. The horizontal support 162 can be used to adjust the horizontal positioning and the angle of these same elements 120, 130, 140, 150. In some examples, the cameras 120 can be adjusted to the vertical position along vertical supports 160 so as to position the cameras 120 at a height that is not higher than 2 inches above the expected location of the candidate's eye height when seated on seat 112.

In some circumstances, the computers 10 can provide control interfaces to aim, position, and adjust the settings of the cameras 120, microphones 130, depth sensors 140, and the interface 150. For example, the computers 10 can provide tracking capabilities for the cameras 120. To allow this, the cameras 120 preferably include motorized mounts that allow for the identification and tracking of human faces, with the computers 10 providing the processing programming and power necessary to both identify and track those faces.

The computers 10 capture video input of the individual 110 from the cameras 120, capture audio input of the individual 110 from the microphones 130, and capture behavioral data input from the depth sensors 140. This data is all synchronized or aligned. This means, for example, that audio information recorded from microphone 136 will be synchronized with video information recorded from camera 122 and behavioral data taken from sensor 142, so that all the data taken at the same time can be identified and compared for the same moment in time.

Positioning of Booth Components

Figure 2:
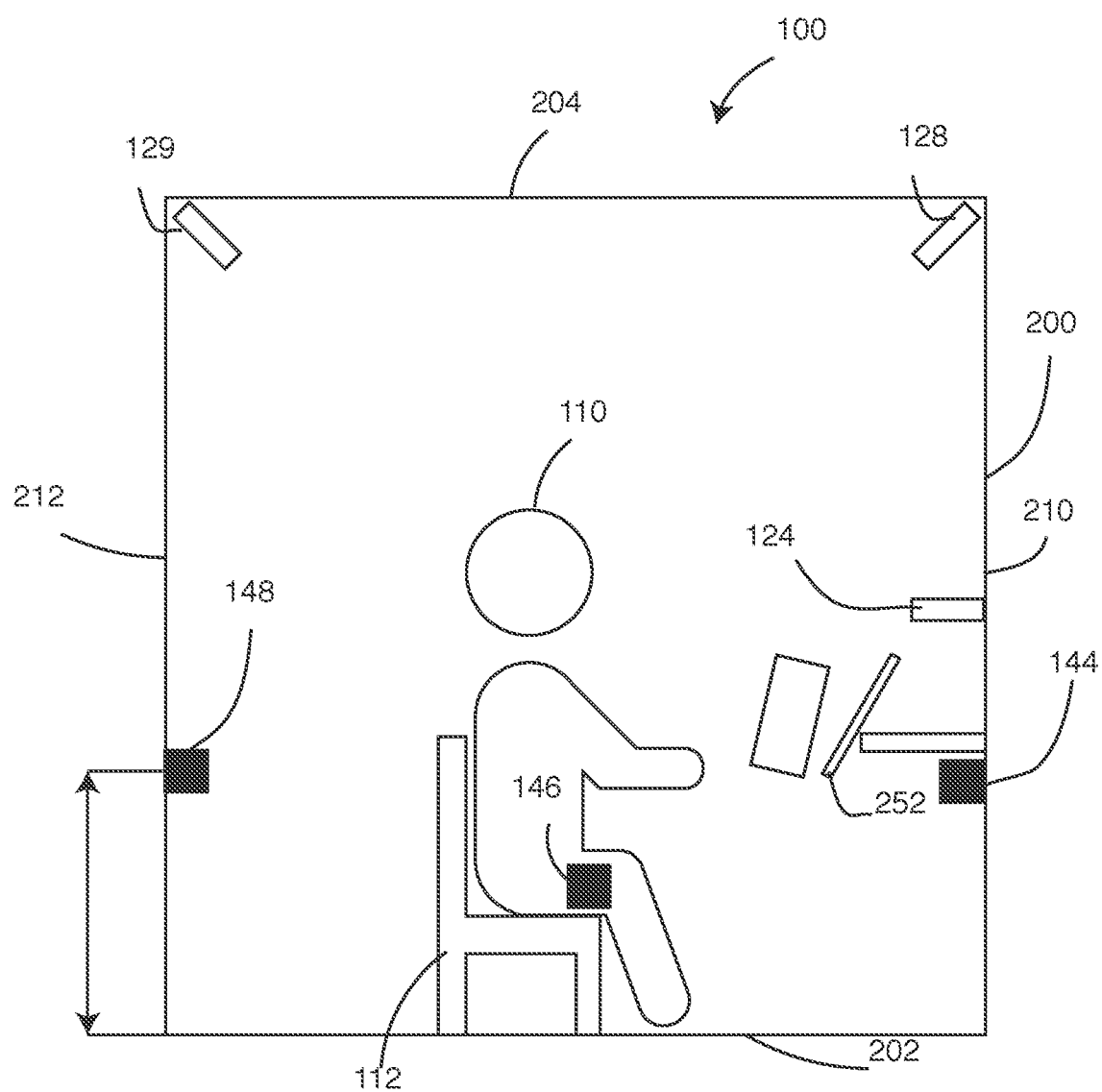
FIG. 2 is a schematic, side view of a cross-section of a kiosk similar to the kiosk of FIG. 1.
Figure 3:
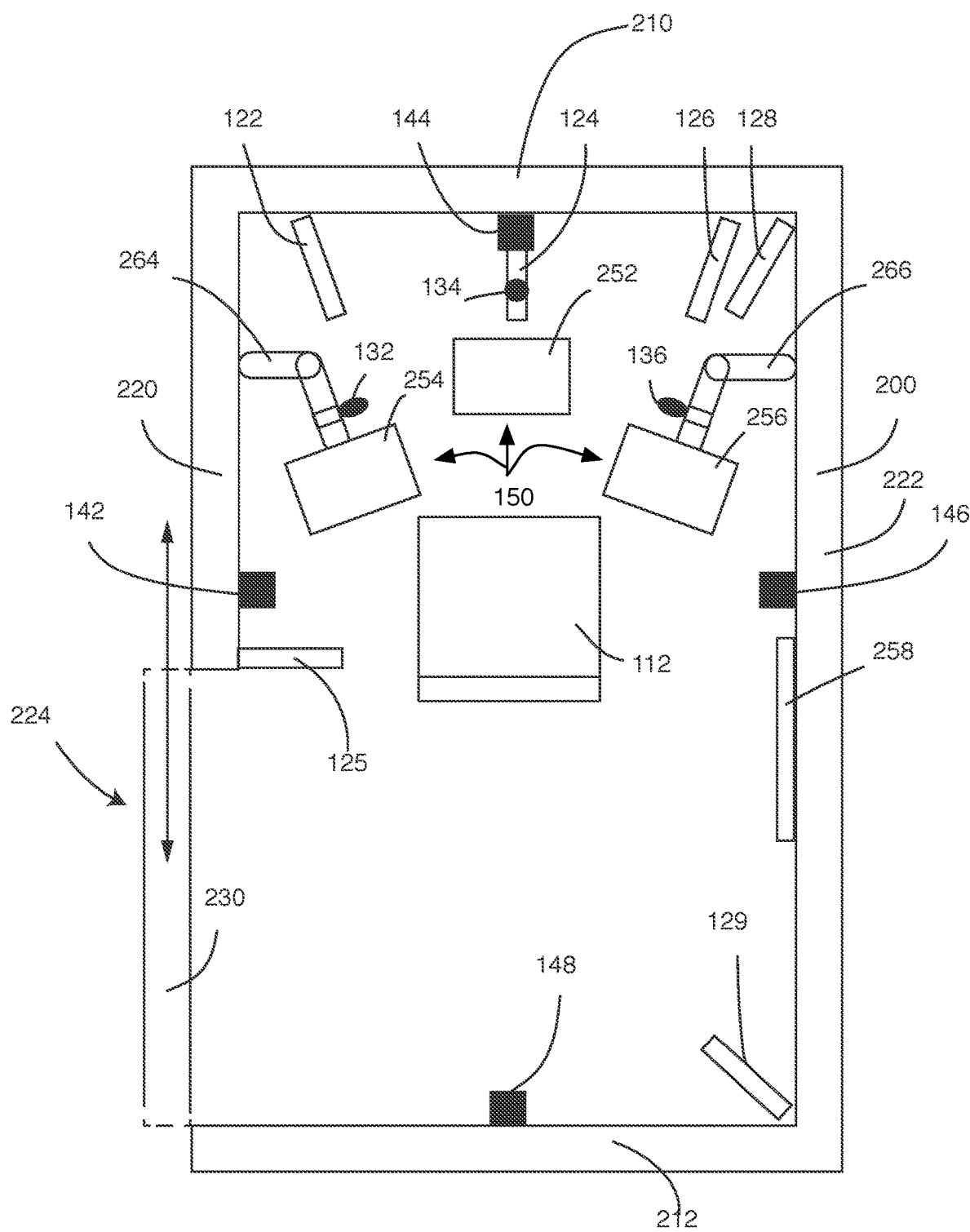
FIG. 3 is a schematic, top view of a kiosk similar to the kiosk of FIG. 1.

FIG. 2 shows a schematic side view of a cross-section of one embodiment of the kiosk 100. FIG. 3 shows a top view of a similar embodiment. An enclosing wall 200 forms a perimeter of the booth 100 and defines an interior and an exterior of the booth 100. The wall 200 extends from a bottom 202 of the booth 100 to a top 204. In various examples, the enclosing wall 200 can include a frame and panels. The frame can be formed of an extruded metal, such as extruded aluminum. The panels can be formed of a polymer, such as polycarbonate. These panels can be opaque, translucent or semi-translucent.

In some embodiments, the booth 100 can include a roof. This roof can comprise the same type of panels as the enclosing wall 200. In outdoor examples, the roof can include solar panels. In indoor examples, the booth 100 can be formed without a roof. A noise canceling or white (or other color) noise machine can be disposed within or in the immediate neighborhood of the booth 100 if the booth 100 is located in a noisy environment.

The enclosing wall 200 can take a generally rectangular shape, including a front wall 210, a back wall 212, a first side wall 220, and a second side wall 222. In some examples, the first side wall 220 or the second side wall 222 can define a door opening 224 containing a door 230. The door 230 can be a sliding or barndoor type door with overhead rollers. In some examples, the door 230 is comprised of the same materials as the enclosing wall 200.

As explained above, the booth 100 can include a first camera 122, a second camera 124, and a third camera 126, all of which are aimed proximally toward the seat 112 found in booth interior. In some examples, the first camera 122, the second camera 124, and the third camera 126 are disposed on or adjacent to the front wall 210 and are positioned at a height approximately equal to the face or eye height of the individual 110 when seated on the seat 112.

In one embodiment, the booth 100 includes a fourth video camera 128 and a fifth video camera 129. The fourth camera 128 is disposed adjacent to or in the corner of a front wall 210 and a side wall 220 or 222 near the top 204 (such as a side wall that is opposite from a door), while the fifth camera 129 is disposed adjacent to or in the corner of a back wall 212 and a side wall 220 or 222, also near top 204. At least one of these cameras 128, 129 are aimed toward the door 230 of the booth 100. In some examples, the fourth camera 128 and the fifth camera 129 are infrared cameras and are used as an occupancy sensor that monitors the number of people 110 within the booth 100. One or more of the computers 10 monitoring these cameras 128, 129 can provide a security warning if one or more people are determined to be within the booth 100 when no people are expected to be within the booth 100. In some implementations, a cheating warning will be given if two or more people are determined to be within the booth 100 when the computers 10 only expect a single person to be present.

FIG. 2 and FIG. 3 show a booth 100 utilizing four depth sensors 140. In particular, the first depth sensor 142 is located on the first side wall 220, the second depth sensor 144 is located on the front wall 210, the third depth sensor 146 is located on the second side wall 222, and the fourth depth sensor 148 is located on the rear or back wall 212. The depth sensors 140 can be disposed at various heights in the booth 100 depending upon the goal or aim of the sensor 140. Sensors 140 aimed at the legs of a seated individual 110 (such as sensors 142 and 146) should be positioned at approximately the knee height of the individual 110. Sensor 148 is ideally positioned to see the back or torso of the individual 110, and therefore must be positioned at a height equal to (at least) the height shoulder of the individual 110 when seated. The front depth sensor 144 can be positioned at the torso or face height of the seated individual 110, depending on the goal of the sensor 144. By positioning the depth sensors 140 in this manner, at least one depth sensor 140 is configured to detect foot movement, torso movement, body posture, body position, facial expressions, and hand gestures of the individual 110.

The booth 100 can include one or more user interfaces 150. As shown most clearly in FIG. 3, the booth 100 can include a primary or centered user interface 252 that is substantially centered relative to a chair or stool 112 within the booth 100. In some examples, the primary user interface 252 can prompt the individual to demonstrate a skill or talent, or prompt the individual to answer one or more questions. In other examples, a second user interface 254 prompts the candidate while the first user interface 252 displays a video of the candidate. In some examples, a third user interface 256 can be included in the booth 100. The candidate can use the third user interface 256 as data input in order to demonstrate the skill or talent, or to otherwise enter information.

In some examples, a fourth user interface 258 provides a simple, non-electronic item such as a whiteboard, a flip pad, wipe-off board, or other product that the candidate can write on. In such examples, an additional video camera 125 can be provided opposite to the fourth user interface 258 for the computers 10 to capture the information and movement created by the individual 110.

The user interfaces 150 can take the form of a computerized or computer-driven device such as a standard computer display, a touchscreen, a tablet or laptop PC, a netbook, a mobile phone, or another type of communications-capable device such as an interactive whiteboard (IWB) also commonly known as an interactive board or a smart board, such as those available from SMART Technologies, Calgary, Alberta, Canada. Interfaces 150 can provide input into the computers 10 and are stored and organized by the computers 10 along with the data from the cameras 120, microphones 130, and depth sensors 140.

In some examples, one or more of the user interfaces 150 can be mounted on an adjustable arm. In FIG. 3, the second user interface 254 is located on arm 264, and the third user interface 256 is located on arm 266. In some examples, the arms 264, 266 can be adjustable, such as to rotate or translate from a first position to a second position.

FIG. 3 shows microphone 134 mounted adjacent to the middle or second camera 124. While the first and third microphones 132, 136 could be mounted immediately adjacent to the first and third cameras 122, 126, respectively, they are not so mounted in FIG. 3. Rather, the first microphone 132 is mounted on arm 264 while the third microphone 136 is mounted on arm 266. Because these arms 264, 266 are intended to be adjusted while in use in order to bring interfaces 254 and 256 closer to the individual 110, such adjustments will also bring the microphones 132, 136 closer to the individual 110. This should lead to better sound reception from these microphones 132, 136 when the individual 110 is focusing their attention to either the left or right of the center camera 124.

The microphones 130 can be used to provide input to behavioral analysis. Speech recorded by the microphones 130 can be analyzed to extract behavioral data, such as vocal pitch and vocal tone, speech cadence, word patterns, word frequencies, total time spent speaking, and other information conveyed in the speaker's voice and speech. Additionally, the audio can be analyzed using speech to text technology, and the words chosen by the candidate while speaking can be analyzed for word choice, word frequency, etc.

Controller, Audio, and Video Computers

Figure 4:
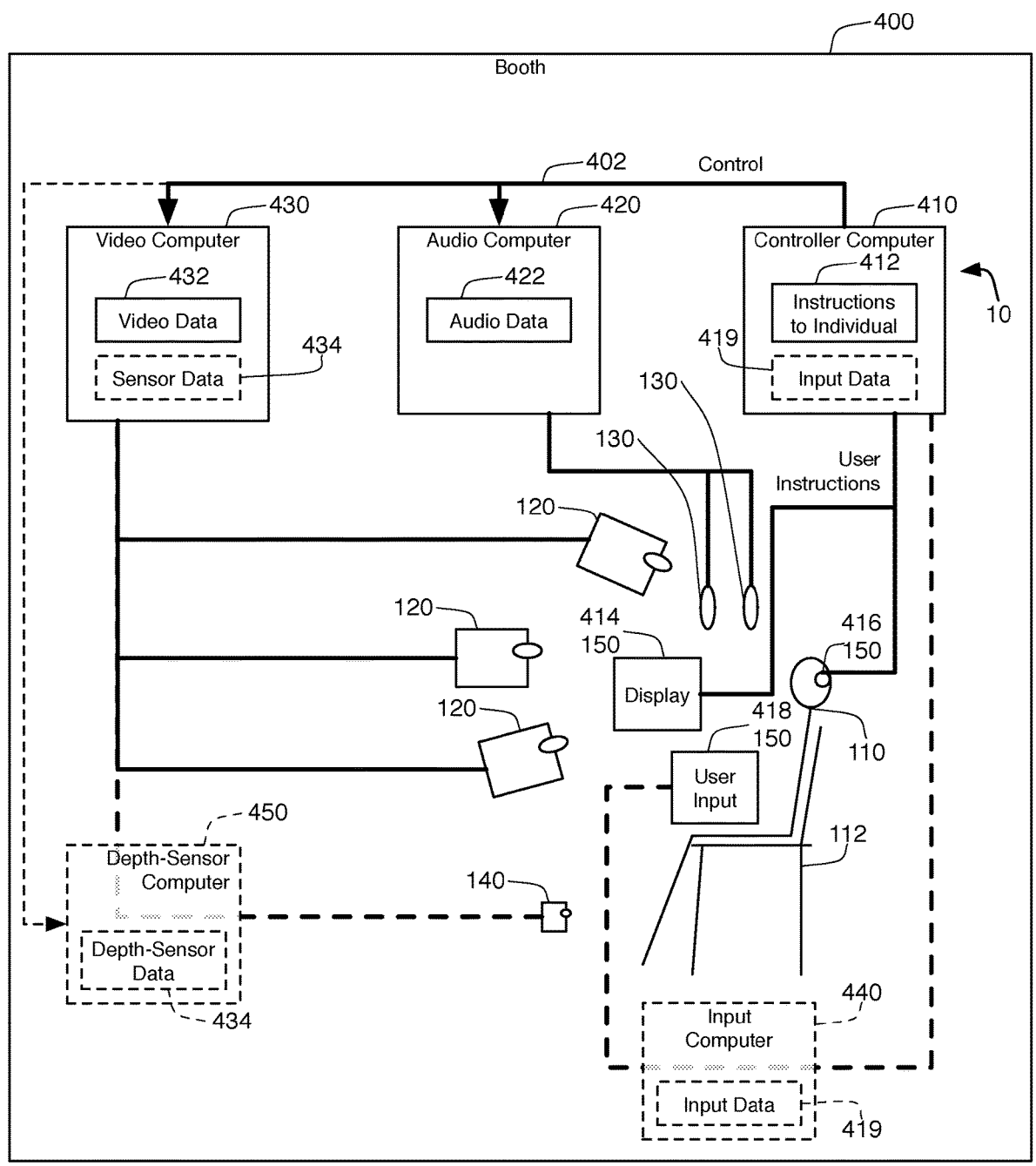
FIG. 4 is a schematic view of another embodiment of a kiosk having a controller computer, an audio computer, and a video computer.

FIG. 4 shows a kiosk or booth 400 similar to kiosk 100 described above. This kiosk 400 is also under control of at least three computers, identified as the controller computer 410, the audio computer 420, and the video computer 430. The controller computer 410 is generally responsible for coordinating the overall elements of the booth 400. For instance, the controller computer is able to provide instructions 412 to a user 110 seating on seat 112. These instructions 412 can be stored on the controller computer 410 as data or as programming operating on the computer 410 and can be presented through one or more user interfaces 150. For example, the instructions 412 can be presented to the individual 110 through one or more displays 414 that are visible to the individual 110 when using the booth 400. Furthermore, audio instructions 412 can be provided to the individual 110 either through speakers integrated into the booth 400 or through earpieces or headphones 416 worn by the individual 110. In addition, the controller computer 410 is responsible for receiving input data from the user through input interface 418. This user input data 419 can be stored on the controller computer 410 for later processing. Each of these interfaces 414, 416, 418 are examples of the user interfaces 150 described above.

As explained above, some alternative embodiments use tablet computers 154 to generate some of the user interfaces 150. Tablet computers 154 are useful in that they are able to both present information to the user and receive textual and non-textual data. In addition, tablet computers 154 include additional sensors and inputs such as fingerprint identification hardware, microphones, and video cameras, each of which could prove useful in implementing booth 400. Tablet computers 154 used in the booth 400 will be programmed to operate a single app, with the app presenting information and receiving input for the booth 400. However, it can be difficult to lock tablet computers so that they run only the single app dedicated to the booth. Consequently, touch screens similar to those provided by tablet computers may instead be used to provide the booth user interfaces 150. In these embodiments, the controller computer 410 will be in direct control of touch screens in order to provide the necessary instructions 412 and receive input data 419 from the user 110.

The audio computer 420 is responsible for the control and receipt of audio data from microphones 130. To the extent settings or configurations on the microphones 130 need to be changed, this would happen under the control of the audio computer 420. The audio computer 420 receives and stores the audio information from the microphones 130 as audio data 422 whenever the booth 400 is recording the individual 110.

The video computer 430 is similarly responsible for the control and receipt of video data from cameras 120. The video computer 430 is preferably specially configured to handle video processing in an efficient manner. In one embodiment, the video computer 430 contains a high-powered graphics processing unit (or GPU) that will speed up its handling of the multiple video feeds coming from the multiple cameras 120. The GPU can be responsible, for instance, for all video encoding and decoding required by the booth 400. The video information received from the cameras 120 are stored on the video computer as video data 432.

Booth 400 may also contains at least one depth sensor 140. In other embodiments, multiple depth sensors 140 will be used, as described above in connection with FIGS. 1-3. In one embodiment, the depth sensor 140 is a stereo optical depth sensor that requires complex video analysis in order to render a depth analysis of the viewed scene. Consequently, the video computer 430 with its GPU may be best positioned to receive, analyze, and store this sensor data 434 because of the visual/graphical nature of these processes.

In alternative embodiments, a fourth computer 440 and/or a fifth computer 450 can be utilized at the booth 400. The fourth or input computer 440 takes over the responsibility of handling user input data 419 in order to free up the controller computer 410 to perform other functions. This same input computer 440 could, in some embodiments, control all user interfaces 150 in the booth 400. Similarly, the fifth or sensor computer 450 can take over the responsibility of storing and processing sensor data 434 from the sensors 140. In yet still further embodiments, only the three main computers 410, 420, 430 are used in the booth 400, and the controller computer 410 takes responsibility for handling the user interfaces 150 and the depth sensors 140, as well as for handling their related data 419, 434.

Although these alternative embodiments are possible, the preferred embodiments assign responsibility for handling audio data 422 to the audio computer 420 and assign responsibility for handling video data 432 into the video computer 430, with a third controller computer 410 responsible for handling at least some other functions of the booth 400. The assignment of the task of processing input data 419 and sensor data 434 among the computers 10 is not as important as this dedication of audio and video processing to the audio and video computers 420, 430, respectively.

Another responsibility of the control computer 410 is to provide control signals 402 to the other computers 10. In the embodiment utilizing only three computers, the control signals 402 ensure that the audio computer 420 and the video computer 430 work in cooperation with the control computer 410 to operate the booth 400. The controller computer 410 will use the control signals 402 to tell the audio and video computers 420, 430 when to begin recording audio and video data 422, 432, respectively, and when to stop. When it is necessary to stream this data to different users, as described below, this process will also be made possible through the use of the control signals 402. In some embodiments, the control signal 402 is transmitted over a local area network (or LAN). This LAN can be hard-wired (such as an Ethernet-based network) or can be wireless (such as a network based on the 802.11 standards of the IEEE, or Institute of Electrical and Electronics Engineers, of New York, N.Y.). Alternatively, in other embodiments, a direct wired connection such as a serial connection can be used to provide the signaling and instructions that form the control signals 402. FIG. 4 shows the control signals emanating from the controller computer 410 because these types of instructions generally originate from this computer 410. In actual practice, control-type signals 402 will travel in all directions between the computers 10.

As is explained in more detail below, the controller computer 410, the audio computer 420, and the video computer 430 do not only need to communicate between themselves through control signals 402, but they must also communicate with remote computer systems not shown in FIG. 4. Because of this, one embodiment of booth 400 incorporates 5G data communications into each of these three computers 410, 420, 430 through the use of 5G data transceivers (also not shown in FIG. 4). One benefit of 5G communications is that each computer 410, 420, 430 is provided with the ability to make wide area network communications without relying upon one another and without relying upon physical, hardware cabling. Physical, inter-computer cabling presents an additional failure point in the booth 400. In addition, because of the potentially isolated location of booth 400, cabling between the computers 410, 420, 430 and to a wide area network presents an attractive target for vandals and other malicious actors. Consequently, at least one embodiment of booth 400 uses 5G technology to process all inter-computer communications including the control signals 402 that pass between the controller computer 410, the audio computer 420, and the video computer 430.

Figure 5:
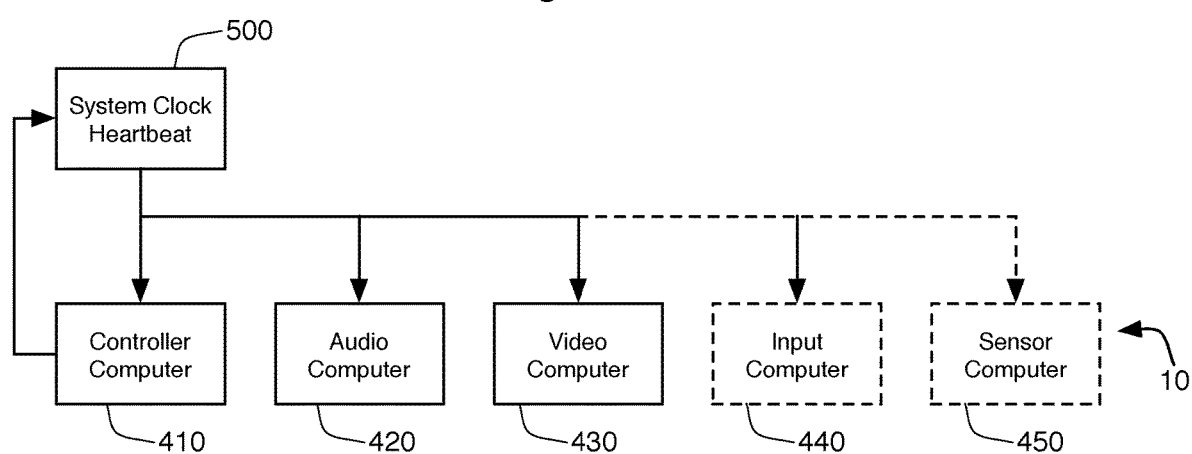
FIG. 5 is a schematic view showing a heartbeat system clock being shared with a plurality of computers.

Because different computers (at least computers 410, 420, 430) are storing different types of data (at least data 412, 422, 432), it is important that these computers 10 work together to ensure that their separate data can be later combined into a whole presentation. As FIG. 5 shows, one way to accomplish this is through the use of a system clock 500 that provides a heartbeat signal to the various computers 410, 420, 430, 440, and 450 that allows for synchronization of the audio and video images. The system clock 500 creates a heartbeat or universal clock signal that allows each computer 10 to record its data along with an appropriate timestamp. In effect, a timeline is created that is uniform across the multiple video inputs 120 and audio inputs 130 present in the kiosk 400. The timeline enables video input from each camera 120 to be time-synchronized with the audio input from each microphone 130. During use, each camera 120 records a stream of video that is stored on the video computer as separate video data 432 for each camera 120. Each microphone 130 records a stream of audio that is stored on the audio computer 420 as separate audio data 422. With the universal heartbeat 500, a portion of any video data 432 can be combined with any audio data 422 from the same time frame into a single presentation that is perfectly synchronized. Furthermore, data such as an input data 419 and sensor data 434 can also be integrated in a synchronized fashion.

In one embodiment, the system clock or heartbeat signal 500 comes from an external device (such as a clock) that is in communication with all of the computers 10. In another embodiment, a single computer 10, such as the controller computer 410, generates the heartbeat signal 500 and shares it with all the other computers in the kiosk 400 to keep the data files in sync. This signal could form part of the control signals 402 shared between the computers 10.

Other types of clock synchronization techniques can also be utilized to have the computers 410, 420, 430, 440, 450 agree on a common timeframe in which to store their data. In still further embodiments, clock synchronization is not utilized to keep the data files in sync. In these embodiments, analysis of the data files themselves identifies similarities associated with identical, real-world events. The audio and video data is analyzed to recognize commonalities based on time, duration and digital signal patterns in order to bring disparate data sources into sync.

Behavior Analysis and Augmentations

Figure 6:
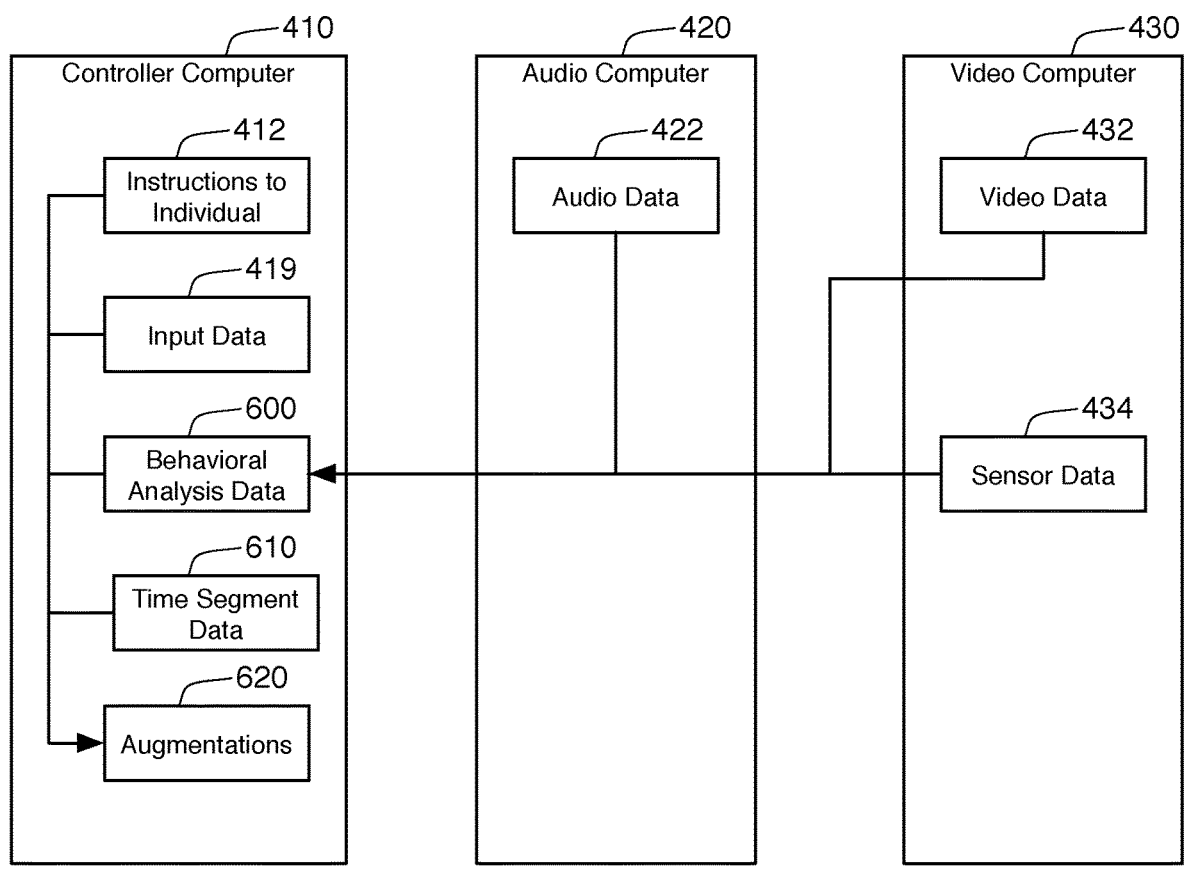
FIG. 6 is a schematic view showing the creation of behavioral analysis data using audio, video, and sensor data, and the creation of time segments and augmentations.

FIG. 6 shows the controller computer 410 and its stored instructions 412 to the individual 110, the audio computer 420 and its stored audio data 422, and the video computer 430 and its stored video data 432 and sensor data 434. Data 422, 432, and 434 are the data created by the booth 400 after a session with individual 110 has been recorded. The instructions 412 indicate the instructions that were provided to the individual 110 during the recording. As explained above, all of this data is time synchronized according to the heartbeat signal 500 that is shared between these three computers 410, 420, 430. This heartbeat signal 500 can be used to identify the time during the recording session with the individual 110 that particular instructions 412 were provided to that individual 110, such that the instructions 412 themselves are time synced to the audio data 422, the video data 432, and the sensor data 434.

These instructions 412 can take a variety of forms, depending on the type of session that is being recorded for the individual 110. In one embodiment, the kiosk 400 is being used to conduct an automated employment interview with the individual 110. To begin the interview, the individual 110 sits on seat 112 in front of the video cameras 120, microphones 130, and depth sensors 140. The height and position of each of the video cameras 120 and the depth sensors 140 may be adjusted to optimally capture the video data 432 and to record helpful behavioral data. Instructions or questions 412 are provided to the individual 110, the individual 110 responds, and the data 422, 432, 434 are captured.

The depth sensor data 434 records the body movements, posture, hand movements, leg movements, and sometimes even facial features and reactions of the individual 110 during a recording session. This depth sensor data 434 on its own reveals a great deal of information about the behavior of the individual 110. This data can also be combined with other data, such as video data 432 or audio data 422, in order to develop a deeper understanding of the individual's behavior. For example, depth sensor data 434 can be combined with the video data 432 of the user's face in order to develop a better understanding of the facial reactions and expressions of the individual 110. In other embodiments, audio data 422 is also analyzed, as pitch and tone can indicate the stress and comfort level of the individual 110 during the recording session. In still further embodiments, the audio data 422 is converted to textual data (using speech-to-text technology), and the textual data can form part of the behavior analysis. In one embodiment, it is the responsibility of the controller computer 410 to analyze this different type of data 422, 432, 434 in order to reach conclusions or make other types of analysis concerning the behavior of the individual 110 during the recording session. This result of this analysis is the behavioral analysis data 600. In some examples, the behavioral analysis data 600 relates to an attempt to score the individual 110 on a particular characteristic, such as sincerity, empathy, or comfort. This type of scoring is further described in the incorporated patent applications identified above.

In the context of a video interview of a job candidate 110, predetermined interview questions 412 are presented to the candidate, and the candidate answers the questions orally while being recorded using cameras 120, microphones 130, and depth data sensors 140. The controller computer 410 uses the heartbeat 500 to record when particular questions 412 are being asked. This timing information can be used in order to divide the entire session with the individual 110 into separate time segments. The definition of each time segment is stored in time segment data 610. For instance, if thirty questions are asked of individual 110, a separate time segment can be defined for each question resulting in thirty separate time segments that are identified in data 610. If an additional time segment is associated with the time before the first question and after the last question is fully answered, thirty-two time segments would be defined for the session in data 610.

In some examples, the timing or nature of a particular question 412 asked of the individual 110 impacts the resulting behavioral data 600. For example, when the individual 110 is responding to the first question or instruction 412, the controller computer 410 can use the recorded data 422, 432, 434 as a baseline to compare the answers from the beginning of the session to the answers later in the session. As another example, a particular instruction 412 can be designed to stimulate a type of emotional response from the individual 110. Data acquired while the candidate 110 is responding to that instructions 412 can be given more weight in certain types of behavioral analysis. In this way, it can be crucial to analyze the audio data 422, the video data 432, and the sensor data 434 in the context of both the instructions 412 and the time segment data 610.

The instructions 412 can be presented to the individual 110 visually through a display interface 414 or audibly through a speaker interface 416. In response, the individual 110 can verbally answer as though the individual 110 were speaking in front of a live interviewer. In some examples, the instructions 412 will request that the individual 110 to perform a task. This can be a task that is performed electronically through a user input interface 418. Such a task might take the form of answering multiple-choice questions in the form of a quiz. Alternatively, the task may require that the candidate type or write an answer to a free-form question. The task can also require that the candidate stand and simulate a presentation to a board of directors, or to a patient in a hospital bed. In some cases, the task may involve writing on a whiteboard or smart board 258, as might be required if the individual 110 was asked to explain a concept using the whiteboard.

The controller computer 410 is also responsible for generating augmentations 620 that can prove useful when a user is later listening to the audio data 422 and viewing the video data 432. Augmentations 620 can take many forms. In the context of a job interview, an employer may wish to view the answers provided by a job candidate 110 to four particular questions. While the audio data 422 and the video data 432 for those questions can be presented as requested, it would be useful for the employee to see the actual question that was asked of the candidate 110. An augmentation 620 that would be helpful in this context is a textual overlay providing a summary of the question being currently answered over the displayed video data 432. If the candidate provided input data 419 such as by inputting answers to a question on a touchscreen 418, the augmentation 620 for that portion of the audio and video data 422, 432 may indicate the answers selected by the candidate 110, whether the answer was correct or not, and the percentage of candidates that answer the question correctly. The conclusions of the controller computer 410 made in the behavioral analysis data 600 may also be presented to a viewer of the audio and video data 422, 432. This could allow, for instance, a viewer to see that the controller computer 410 scored the candidate high or exceptional for the empathy characteristic while answering the current instruction 412. FIG. 6 shows that the controller computer 410 utilizes all of the instructions 412, the input data 419, the determined behavioral analysis data 600, and the time segmenting data in order to generate the augmentations 620. The controller computer 410 may generate different augmentations for different time segments 610 (different questions). Furthermore, as explained below, the controller computer 410 may identify differences between users and change the augmentations 620 presented during a particular time segment based upon the user viewing the data 432, 422.

In some embodiments, the augmentations 620 take the form of overlays that go over the top of video data 432 (such as a visual text that identifies a question being asked in an interview, or behavioral scoring associated with the current time segment). The augmentations 620 may also take the form of audio that temporarily replaces the audio data 422, or an audio/visual insert that is to be inserted between time segmented portions of the audio and video data 422, 432. In other embodiments, the augmentations 620 may take the form of maps indicating the location of the kiosk 400, or photographs to be overlaid over a portion of the video data 432. In some cases, the augmentation may be information about the individual 110 being recorded.

In the context of video employment interviews, the augmentations 620 may take the form of information from a resume that has been digitally entered into the kiosk 400. The resume information could be, for example, the individual's educational background, their work history, years of experience in an area, etc. This information can be presented in a variety of manners. For instance, a worker's experience using certain technologies as derived from the resume could be represented through visual augmentations. If the individual 110 has experience with certain tools or equipment, images or photographs of that equipment could be presented as visual augmentations. If the individual 110 is a programmer experienced in certain programs, icons or logos associated with those programs could be presented visually as an augmentation. In some embodiments, the augmentations will be screened to reduce the likelihood that the augmentation contains personally identifiable information.

In other embodiments, the augmentation 620 may be a graph showing the individual's movements over the course of the recording. One axis of the graph can be labeled with the instruction (or question) 412 being provided to the individual 110. The other axis of the graph can be labeled with an indicator of the individual's movement, such as leaning in versus leaning out, frequency of movement, size of movement, or a combination of these. In yet another embodiment, the augmentation 620 may be a reproduction of the user's input data 419 taken from the user input 418. For example, if an individual is asked to work through a problem or to explain a subject using, in part, the user input device 418 (such as a smart board), the augmentation 620 may be a reproduction of that individual's input. Since this is time-stamped, the input reproduction can be included in the presentation 714 at the appropriate time location.

Presentation Generation

Figure 7:
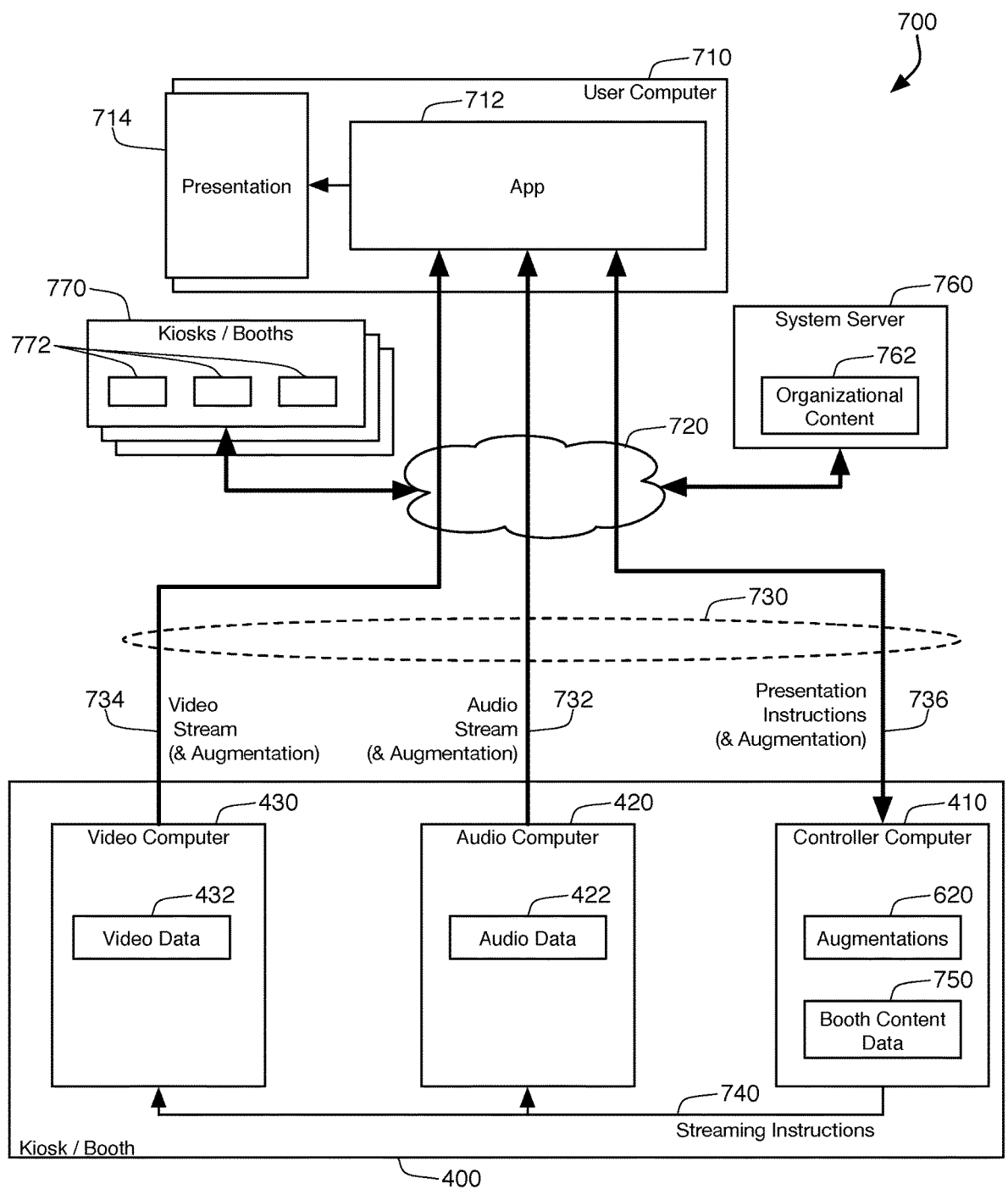
FIG. 7 is a schematic view of a networked systems of a plurality of kiosks, a system server, and a user computer.

FIG. 7 shows a system 700 in which a kiosk 400 provides data and instructions to a remote user computer 710 over a network 720. The network 720 can take the form of a wide area network such as the Internet. Communications over the network 720 can be formatted in a variety of protocols using a variety of media. As explained above, 5G technology can be incorporated into the booth 400, allowing data communications over the network 720 to pass over a 5G data network.

The user computer 710 is a computer operated by a user that is interested in viewing the audio and video data 422, 432 recorded by the booth 400 of individual 110. The audio data 422 was recorded directly from the microphones 130 onto the audio computer 420, and the video data 432 was recorded directly from the cameras 120 onto the video computer 430. This data 422, 432 remains on their respective computers 420, 430 until they are streamed to the user computer 710 in separate data streams 730. In particular, the audio data 422 is sent from the audio computer 420 over a network 720 to the user computer 710 in an audio stream 732. Meanwhile, the video stream 734 is sent from the video computer 430 over a video stream 734.

The user computer 710 is operating a specially designed application or app 712 that receives these separate streams 732, 734 and combines them into a presentation 714. The presentation 714 is an audiovisual presentation combining audio from the audio stream 732 and video from the video stream 734. The presentation 714 can be presented on a user interface on the user computer 710, such as a screen or monitor and speakers. The user computer 710 can take the form of a personal computer, portable computer, or server. As such, this computer 710 would be similar to the computers 410-430, in that it contains a CPU, memory, data, and programming instructions. Alternatively, the user computer 710 can take the form of a mobile device such as a tablet computer or a smart phone. The app 712 comprises a specially programmed application or app that is designed to combine the separate audio and video streams 732, 734 into the presentation 714.

The controller computer 410 communicates with the user computer 710 in order to set up the transmission and receipt of the audio stream 732 and video stream 734. This communication generally takes the form of presentation instructions 736, which constitutes the information that is necessary for the app 712 to successfully receive the streams 732, 734 and successfully combine them into the presentation 714. These presentation instructions 736 can include network addresses of the audio and video computers 420, 430 or other information necessary for a direct connection of the streams 732, 734 to be established between the audio and video computers 420, 430 and the app 712 of the user computer 710.

In addition to the audio and video data 422, 432, certain embodiments also provide the augmentations 620 to the user computer 710 for integration into the presentation 714. In one embodiment, the augmentations 620 are submitted by the controller computer 410 to the app 712 along the same data path or stream 736 used to communicate the presentation instructions. The presentation instructions inform the app 712 of the augmentations 620 and how they should be integrated with the audio stream 732 and the video stream 734 to generate the audiovisual presentation 714. For example, this stream 736 might provide an augmentation 620 in the form of a graphical element, along with instructions telling the app 712 to overly this graphic on the lower right corner of the video stream 734 between the times of 6 minutes, 20 seconds and 6 minutes, 30 seconds of the presentation. In other embodiments, the augmentations 620 is first communicated to one of the other computers 420, 430, which then directly incorporate the augmentation 620 into their data streams 732, 734, respectively. For instance, the graphical element augmentation 620 can be communicated to the video computer 430. The video computer 430 (and its GPU) would be responsible for overlaying the augmentation 620 onto the video data 432 that it is transmitting so that the video stream 734 includes the necessary augmentation during the correct time period.

The controller computer 410 must also communicate streaming instructions 740 to the audio computer 420 and the video computer 430. These instructions inform the computers 420, 430 which portions of their data 422, 432 should be transmitted in the streams 732, 734. This specifies not only the individual 110 for whom the data 422, 432 was recorded, but also which portions of that individual's session should be transmitted and in what order. This selection of only a portion of the data 422, 432 recorded for an individual 110 is described in more detail below. In one embodiment, it is the controller computer 410 that arranges the communication with the app 712, selects the portions of the audio and video data 422, 432 to be shared, identifies the augmentations 620, and then informs the audio and video computers 420, 430 how and where to transmit their data streams 732, 734. The controller computer 410 is also responsible for ensuring that the data streams 732, 734 are transmitted sufficiently in sync so that the app 712 can effectively merge these streams 732, 734 and create the presentation 714 on-the-fly.

This on-the-fly ability means that the app 712 is not required (nor, perhaps, even allowed) to store all of the audio data 422 and video data 432 on the user computer 710 in order to create a new audiovisual file. Audio and video data 422, 432 is streamed to the user computer 710 and immediately presented through presentation 714. This allows the booth to maintain the only storage of the audio and video data 422, 432. Furthermore, the fact that the audio data 422 and video data 432 are maintained and streamed separately, and not pre-combined into a single audiovisual file or single audiovisual stream, gives the booth 400 greater flexibility in customizing the resulting presentations 714 based on the user of the user computer 710, as is explained in more detail below.

Before any data streams 730 are established between the booth 400 and the user computer 710, the user computer 710 must identify an individual 110 for whom the booth 400 has relevant data (such as data 422, 432). In one embodiment, the booth 400 maintains booth-level content data 750. This data 750 includes information about all of the individuals 110 that have had sessions recorded at the booth 400. To the extent possible, the booth-level content data 750 will not actually contain personally identifiable information, but rather would use unique identifiers to identify the individual 110. Personal information is preferably saved remote from the booth for more secure storage, such as at a system server 760, which is described in more detail described below. Additional information may also be stored depending on the purpose of the recorded session. In the context of employment interviews, the booth content data 750 may also include a digital copy of a resume, contact information, an employment history, and a list of those regions of the country that the individual may be willing to relocate, etc. In the context of a musical demo, the booth content data 750 might include the instruments the musician plays, their available dates, and their expected compensation.

In one embodiment, a system server 760 collects booth content data 750 from booth 400 and stores it in an organizational content database (or other type of data store) 762. The system server 760 is preferably in communication with a plurality of other kiosks 770. Some or all of the other kiosks 770 may also utilize at least three separate local computers 772. Booth content data from the other kiosks 770 can be aggregated with the data 750 from booth 400 into the database 762. Users of the user computer 710 can access the system server 760 and perform searches on the organizational content 762. In incorporated patent application Ser. No. 16/366,703, a system and method for rating interview videos is presented. For example, this '703 application teaches the creation of an empathy score by examining the video 432, audio 422, and depth sensor data 434 of an interview candidate 110 during a recording session at a booth 400. This incorporated application also describes the creation of a combined score that incorporates the empathy score with an evaluative score based on considering an applicant's attention to detail and career engagement. Regardless of the technique used, it is possible to create an overall evaluation score for various individuals that have recorded sessions at any of the booths 400, 770. These scores can be associated with data 762 and be provided to users that are searching this data 762.

If, after searching this data 762, the user identifies an individual 110 of interest, the system server 760 will initiate a direct communications link between the controller computer 410 of booth 400 and the app 712 on the user computer 710. At this point, the app 712 can make a request to the booth 400 (likely received by the controller computer 410), and then can receive the data streams 730 and present an audiovisual presentation 714 of the individual 110.

In one embodiment, the system server 760 can also be the recipient of the data streams 730. In this embodiment, the system server 760 identifies one or more preferred versions of an individual's recording session at the booth 400. If there are multiple preferred versions, these could be based on the expected purpose for which the versions will be viewed. In the instance of a job candidate interview, for instance, it may be that the individual 110 is qualified for multiple job types. As a result, the system server 760 may decide to create multiple preferred versions of the interview. Using the same techniques as described before for sending streams 730 to the user computer 710, similar streams 730 would be sent to the system server 760 where they can be converted into audio/visual files and stored as preferred final versions 764. This alternative version of creating stored audio/visual files outside of the booths 400, 770 is not preferred, however, as it is generally preferable to leave the raw data at the booths 400, 770 and create custom data streams 730 directly to a user computer 710 as is further described below.

It is important that the system 700 secure the confidentiality of, and restrict access to, the data in its organization content database 762, the booth content data 750, augmentations 620, the audio and video data 422, 432, and any other data maintained by the system 700. To accomplish this, no user computer 710 may access any of the data stored at the booths 400, 770 or on the system server 760 unless the user computer 710 is fully authenticated and authorized. In one embodiment, user authentication and authorization is performed by the system server 760. Only under the management of the system server 760 is communication allowed between the user computer 710 and any of the booths 400, 770. In other embodiments, the booths 400, 770 take on some or all of the authentication and authorization tasks. In addition, data stored at the local booths 400, 770 is also secured against physical tampering or access. Encryption can be used when storing any local data (including audio and video data 422, 432). In this manner, even if physical access is obtained to the data at the booths 400, 770, data relating to any specific individual 110 remains secure.

In still further embodiments, the system 700 is designed to prevent personally identifiable information (or "PII") from remaining stored at any of the booths 400, 770. This can be accomplished through the use of a personal identifier that associates all data on the booths 400, 770 with a particular individual 110. This personal identifier is associated with PII only at the system server 760. When providing the presentation 714 to the user computer 710, the booths 400, 770 can access the PII necessary to create the streams 730 (including any augmentations 620) from the system server 760 using the personal identifier.

It is also important that every individual 110 who records a session at the booth 400 be fully aware of how their recorded data will be used, stored, processed, and shared. This is typically accomplished through informational and contractual content that is provided to the individual 110. In this way, the system 700 will handle the data of the individual 110 only in a manner consistent with that agreed to by the individual 110.

Segmentation of Audio and Video Data

Figure 8:
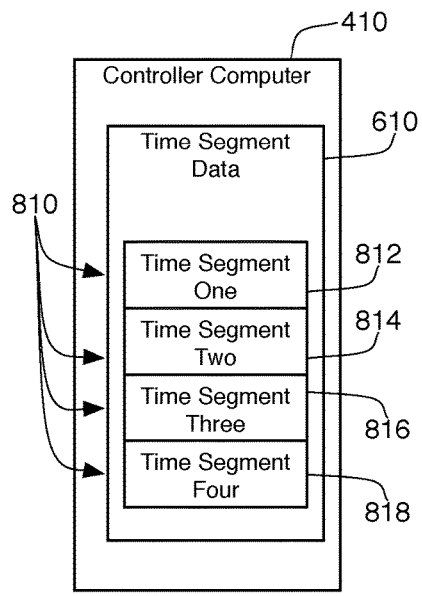
FIG. 8 is a schematic view illustrating time segment data.

As explained above, in one embodiment of the present invention the controller computer 410 divides the time in which an individual 110 is being recorded into different time segments. This results in the creation of time segment data 610, which is shown in more detail in FIG. 8. The time segment data 610 records the beginning and ending times (or beginning and duration times) of different time segments 810. FIG. 8 shows four different time segments 810, namely segment one 812, segment two 814, segment three 816, and segment four 818. Although they are not shown in FIG. 8, it is likely that the time segment data 610 for a particular session with individual 110 will include more than four time segments 810. The beginning and ending times in each time segment 810 can be specified based on the system clock or heartbeat 500, meaning that all the computers 10 in the booth 400 will recognize the same times.

In one embodiment, the instructions 412 provided to the individual 110 will lead to natural breaking points in the recordings and therefore are natural divisions between the time segments 810. If the instructions 412 constitute interview questions, for instance, the individual 110 will be given a first question, respond to that question, and then indicate that they are ready for the next question. The time during which the individual 110 responds to each question can determine the various time segments 810. In other words, the time at which each instruction or question is presented to the individual 110 can be tracked, and these known instruction times can be used as the dividing points between time segments 810.

Figure 9:
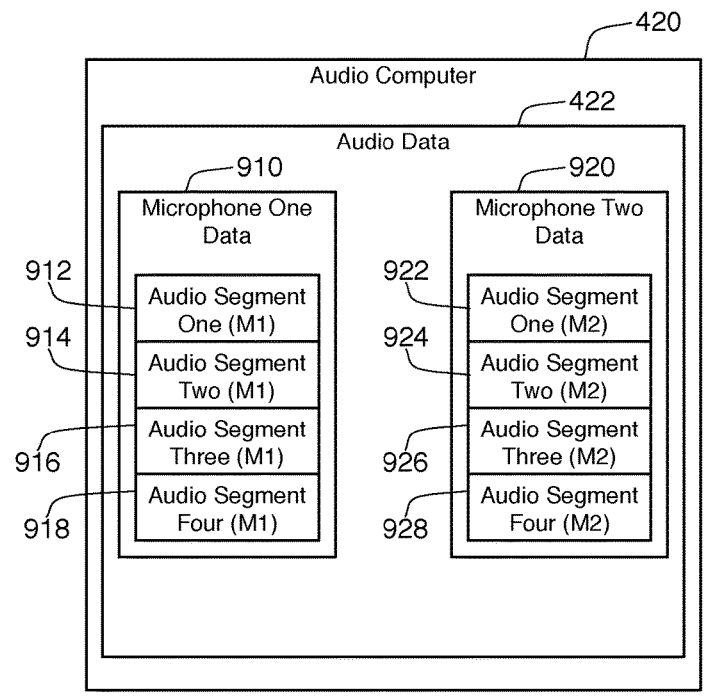
FIG. 9 is a schematic view illustrating audio data on an audio computer.
Figure 10:
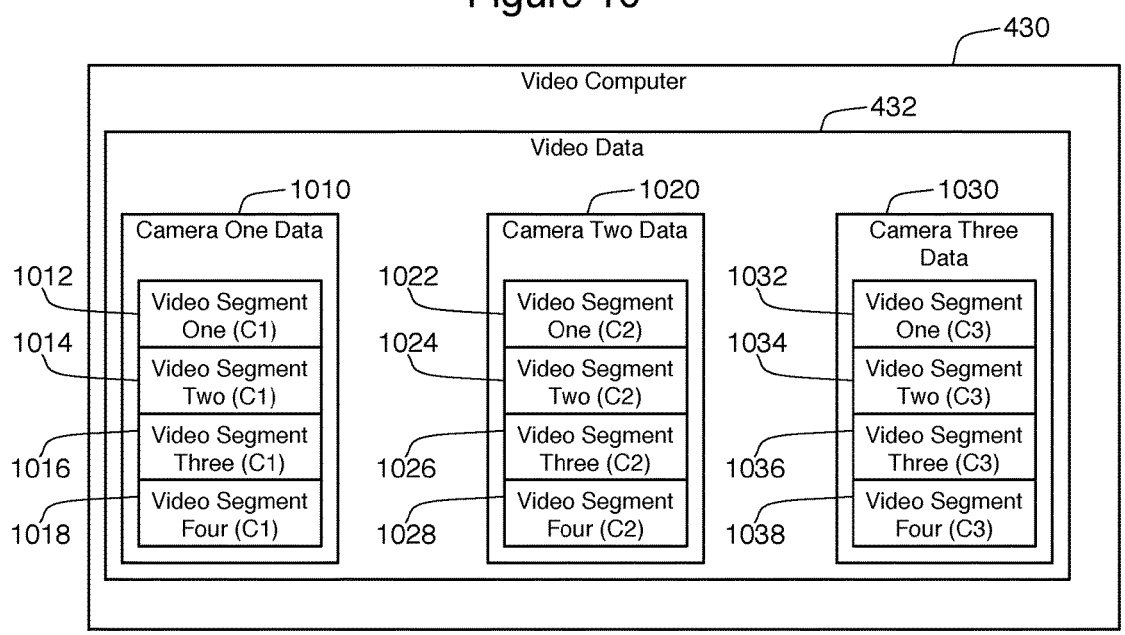
FIG. 10 is a schematic view illustrating video data on a video computer.

As shown in FIGS. 9 and 10, the audio data 422 in the audio computer 420 and the video data 432 in the video computer 430 can be subdivided according to these time segments 810. Since each microphone 130 creates its own audio data 422, FIG. 9 shows microphone one data 910 (recorded by microphone one or "M1") divided into four different audio segments 912, 914, 916, 918. Microphone two data (or "M2") 920 is likewise divided into four audio segments 922, 924, 926, 928. Similarly, camera one data 1010 is divided into four video segments 1012, 1014, 1016, 1018 in FIG. 10, while camera two data 1020 is divided into segments 1022, 1024, 1026, 1028 and camera three data 1030 is divided into segments 1032, 1034, 1036, and 1038.

Although determining when certain instructions 412 are provided to the individual 110 is one of the best ways to divide up the time segment data 610, it is not the only way. The incorporated Ser. No. 16/366,746 patent application, for example, describe other techniques for defining time segments 810. This application described these techniques as searching for "switch-initiating events" that can be detected in the content of data 419, 422, 432, 434 recorded at the booth 400. Furthermore, behavioral data analysis 600 created by analyzing this recorded data can also be helpful. For example, facial recognition data, gesture recognition data, posture recognition data, and speech-to-text can be monitored to look for switch-initiating events. For example, if the candidate turns away from one of the video cameras to face a different video camera, the system can detect that motion and note it as a switch-initiating event. Hand gestures or changes in posture can also be used to trigger the system to cut from one camera angle to a different camera angle. Another type of switch-initiating event can be the passage of a particular length of time. A timer can be set for a number of seconds that is the maximum desirable amount of time for a single segment of video, such as 90 seconds. Conversely, a minimum time period (such as 20 seconds) may also be established to prevent each segment from being too short.

While the Ser. No. 16/366,746 patent application primarily defines switch-initiating events in the context of switching cameras, these events are equally useful for dividing the time segment data 610 into different time segments 810. In one embodiment, the changes in instruction data 412 provided to the individual 110 are first used to create the separate time segments 810. Switching events detected within a single time segment 810 can then be used to split that time segment 810 into two different time segments 810. For example, the Ser. No. 16/366,746 application explains that the identification of low-noise event can be considered a switch-initiating events. If an average decibel level over a particular range of time (such as 4 seconds) is below a threshold level (such as 30 decibels), this will be considered a low noise audio segment that can be used to subdivide time segments 810. In the context of an interview, time segment 814 can originally be defined to cover the entire answer the individual 110 provided to a first instruction 412. If a low-noise event is identified within that answer, time segment 814 is split into two different time segments—one before the low-noise event and one after the low-noise event. Furthermore, this incorporated patent application describes the ability to optionally remove extended low volume segments or pauses from an audiovisual presentation 714 altogether. If time segment 814 were divided into two using this technique, the first of these new time segments would be the time before the beginning of the low noise event, and the second time segment would be the time after the low-volume segment or pause is completed, thereby removing the low volume segment from any of the defined time segments 810.

Selecting Preferred Audio and Video Segments for Each Time Segment

The primary benefit of having multiple cameras 120 and multiple microphones 130 is that it is possible to combine segments that originated from different cameras 120 and different microphones 130 and arrange them automatically into a single audiovisual presentation 714 that that cuts between different camera angles to create a visually interesting presentation. As explained above, the creation of multiple time segments 810 automatically leads to the parallel segmentation of the audio data 422 and the video data 432. More specifically, in the context of FIGS. 8-10, the individual time segments 810 automatically segment microphone one data 910, microphone two data 920, camera one data 1010, camera two data 1020, and camera three data 1030.

For each time segment 810, the controller computer 410 can select the preferred audio and video data source. For instance, if time segment two 814 is desired in the presentation 714, then the controller computer 410 can select between the two microphones 130—namely between audio segment two (M1) 914 and audio segment two (M2) 924—for the audio. The controller computer 410 would also select between the three cameras—between video segment two (C1) 1014, video segment two (C2) 1024, and video segment two (C3) 1034. If the controller computer 410 determines that the best presentation of time segment two 814 is to use audio segment two (M1) 914 and video segment two (C3) 1034, then it will record that determination and use that audio segment 914 and that video segment 1034 whenever time segment two 814 is desired as part of a presentation 714.

In some instances, the presentation 714 may need all time segments 810 relating to a single instruction 412 (such as an interview question). While this may have originally been only a single time segment 810, the process of subdividing the time segments 810 (such as by searching for switching events as described above) may have split this into multiple segments 810. These multiple segments can be grouped together by the controller computer 410. Thus, if a presentation 714 should include the entire answer to question five in an interview, the controller computer 410 would identify all time segments 810 associated with that question. If, for example, three time segments 812, 814, 816 are associated with question five, the preferred selection of audio data 422 and video data 432 may result in a camera one segment 1012 being used for the first time segment 812, camera three segment 1034 for the second time segment 814, and camera two segment 1026 for time segment 816. Meanwhile, audio segments 912 and 914 from the first microphone might be used for the first two time segments 812, 814, and audio segment 926 from the second microphone might be used for the third time segment 816. This arrangement would then be the preferred selection of video data 432 and audio data 422 for the entire answer to question five.

Selecting between microphone one data 910 or microphone two data 920 for a particular time segment likely requires an analysis of the sound quality recorded in the desired segment. In some examples, the highest quality audio is the one with the highest volume, or least amount of noise (the best signal to noise ratio as determined through estimation algorithms). In instances where microphones 130 are embedded into cameras 120, or where each microphone 130 is located physically close to a single camera 120, the preferred audio source can be the microphone 130 associated with the camera 120 that took the preferred video.

Selecting the best video for a time segment 810 can be more difficult, but it is certainly possible. For example, the video data 1010, 1020, 1030 from the multiple cameras 120 can be analyzed to determine whether a particular event of interest takes place. The controller computer 410 may, for instance, use facial recognition to determine which camera 120 the individual is facing at a particular time. In general, controller 410 would prefer the video input from the camera 120 that the individual is facing during a time segment 810. In another example, the controller computer 410 may use gesture recognition to determine that the individual is using their hands when talking. In this circumstance, the controller computer 410 might then select the video data 1010, 1020, 1030 that best captures the hand gestures. If the individual 110 consistently pivots to the left while gesturing, a right camera profile shot might be subjectively better than minimizing the candidate's energy using the left camera feed.

In the above description, the selection of the preferred content for a time segment 810 is accomplished by the controller computer 410. In other embodiments, the video computer 430 could be responsible for analyzing and selecting the preferred video segments, while the audio computer 420 is responsible for analyzing and selecting the preferred audio segments.

Using Stories to Select Time Segments for Users

Figure 11:
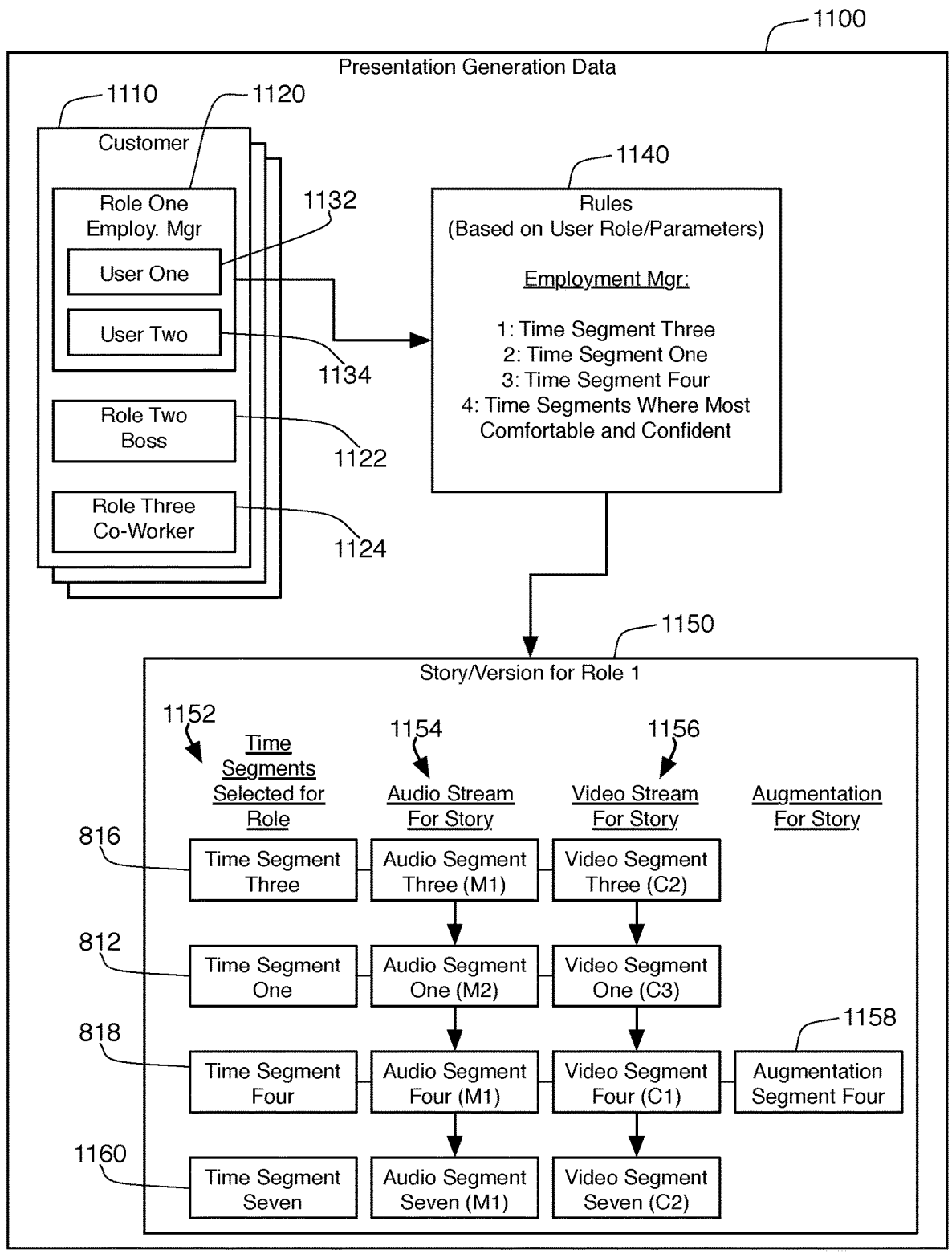
FIG. 11 is a schematic view illustrating presentation generation data that generates a story for presentation.

In one embodiment, the controller computer 410 or the system server 760 maintains and uses presentation generation data 1100, as shown in FIG. 11. This data 1110 includes data about particular customers 1110 that may want to view the presentations 714 created by system 700. In the context of individuals 110 interviewing for potential jobs, the customers may be employers looking to find job candidates. In the context of musicians 110 looking for work, the customers may be venues looking to book an act, agents looking for new clients, or bands looking for new band members.

In one embodiment, information about customers 1110 is subdivided into different individual users that work for the customer. For instance, user one and user two might both be employment managers at a customer corporation. Data about both of these users 1132, 1134 could be stored as part of customer data 1110. In one embodiment, data for both users 1132, 1134 are associated with a single role 1120, which indicates the users' role in the company. In this case, both users 1132, 1134 are associated with the role of employment manager. In FIG. 11, customer data 1110 includes information about three different roles, 1120, 1122, and 1124. Although it is not shown in FIG. 11, roles 1122 and 1124 might also be associated with multiple individual users. Role 1122, for instance, might relate to a boss that is looking to hire someone to work under her, while role 1124 might relate to co-workers that intend to work along-side any new hire.

In the context of an employment interview, users associated with all of these roles 1120, 1122, 1124 would be interested in seeing recorded audio and video data 422, 432 of potential job candidates. However, these users may not be interested in the same aspects of the recorded sessions. This is especially true when a large number of job candidates must be reviewed, and users do not have the time to review the entire recording session of all potential candidates.

In one example, an employment manager may be interested in general questions about how a candidate deals with adversity, handles problems in the workplace, and responds to questions about relocation. A user in the boss role 1122 may be most interested in whether the candidates have the technical ability to handle the requirements of the job. Colleagues 1124 have a lesser interest in the individual's technical background but would like to see portions of the recording sessions that are most likely to reveal the personality of the candidate and their ability to work with others.

The presentation generation data 1100 is able to meet these differing needs of the users 1132, 1134 through the use of rules 1140 that generate different "stories" or "versions" 1150 of the resulting presentation 714 appropriate for the user. In particular, each version or story 1150 is associated with one or more users 1132, 1134 of the customer 1110 based on parameters associated with that user 1132, 1134. The parameters define which set of rules 1140 apply, and the rules create or identify the appropriate story 1150 for that user. In one embodiment, the parameters are based on the role 1120-1124 of the users 1132, 1134 in the context of customer 1110. Other parameters associated with the user are also possible. For instance, each user 1132, 1134 can be allowed to establish preferences within the presentation generation data 1100. These preference parameters can select the rules 1140 that determine the story 1150 to be used for that user. Any request from a user computer 710 to view a version 1150 will include sufficient user information to identify the user's parameters, such as their preferences or their role 1120-1124 within the customer 1110. In this way, the rules 1140 to be used for any user can be customized through user preferences or can be assigned based on the user's role.

A customer can create the rules for each role within that customer, so all users associated with a particular role within that customer will have the same rules applied as any other user associated with the same role. Different customers can establish different rules and different roles. In some embodiments, the same instructions 412 are used for individuals 110 across a set of customers, meaning that a set of pre-defined rules 1140 and roles 1120-1124 can be created as a reusable frame, requiring only minor modifications from customer to customer, if any. Separate frames can be created for multiple industries, such as a frame of rules specific to medical recruitment. Such a frame would allow customers to have a turn-key experience based on recruiting and hiring best practices in their industry without requiring extensive customization and set-up. Roles within the industry could be preconfigured to use a specific set of rules 1140 for story 1150 generation, while still being customizable.

For example, role 1120 suggests that user one 1132 will be most interested in portions of the recording session for individual 110 that relate to user one's role as an employment manager 1120. The rules 1140 established for role 1120 rely upon the fact that the instructions 412 (or questions) presented to the individual 110 are preestablished. The separate instructions 412 are used to generate separate time segments 810. The rules 1140 need only determine which instructions/questions 412 may be of most interest to the employment manager role 1120. As explained above, this employment manager may be interested in how the individual 110 deals with adversity, handles problems in the workplace, and responds to questions about relocation. Most important to this user 1132 is the question about relocation. The rules understand that the answer to the relocation question is found in time segment three 816. Similarly, the other two questions of most interest to this user is found in time segments one 812 and four 818. As explained above, sometimes answers to instructions or questions 412 have been split into multiple time segments 810. In these instances, all of the time segments 810 associated with the identified instructions 412 in the rules 1140 are selected for the story. At this point, the rules 1140 can begin to construct the story or version 1150 shown in FIG. 11 as customized for the identified user. This story 1150 selects the relevant time segments 1152 and sorts them in the order specified by the rules 1140. Because the optimal audio segment and video segment for each of these time segments 816, 812, 818 may have already been pre-determined (see above), these corresponding audio segments 1154 and video segments 1156 are easily selected for the story 1150.

In the example shown in FIG. 11, the controller computer 410 had created an augmentation 620 of some type (such as a visual graph) that is associated with time segment four 818. This augmentation 1158 is then added to the story 1150 for the hiring manager role 1120. It may be that the rules 1140 themselves determine whether augmentations 620 are added to a story 1150. Some users 1132-1134 may prefer not to see augmentations 620. In other cases, multiple augmentations 620 will be available for a time segment, and the rules 1140 determine which augmentation is included in the story for a role 1120-1124.

In some examples, behavioral analysis data 600 is used to select an additional time segment or segments 810 to be included in the story 1150. For example, the rules 1140 for role 1120 might incorporate a time segment or segments 810 in which the candidate 110 expressed the greatest amount of empathy. As explained above, the response to a single instruction 412 (or the answer to a single question) be subdivided into separate time segments 810 by finding switching events inside the time segment 810 representing the response. In these contexts, each of these subdivided time segments 810 might be separately scored and identified. Alternatively, all time segments 810 that relate to a single response or answer might be scored and presented together.

In other examples, the rules 1140 can select the time segment(s) based on particular behaviors identified using the behavioral depth-sensor data 434, such as selecting the time segments 810 based on whether the candidate 11 was sitting upright, or ruling out time segments 810 in which the candidate was slouching or fidgeting. Other rules 1140 relate to behavioral analysis data 600 that indicates whether individual 110 is comfortable or uncomfortable during the recording session. Some movements indicate engagement with what the candidate 110 is saying, while other movements can reflect that a candidate is being insincere or rehearsed. These types of motions include leaning into a camera 120 or leaning away from the camera 120; moving slowly and deliberately or moving with random movements; or having a lower or higher frequency of body movement. The candidate's use of hand gestures can also convey information about the candidate's comfort level and sincerity.

The rules 1140 can use the behavioral analysis data 600 from a single candidate 110 over the course of an interview to analyze which time segments 810 represent the candidate at her most comfortable. The rules 1140 can also use that information to draw valuable insights about the value of the candidate's response to a particular question or instruction. For example, if the behavioral analysis data 600 indicates that the candidate 110 is most comfortable during a question about their background, the rules 1140 may deduce that the candidate is likely a good communicator and the associated time segments 810 will be considered to be more useful for certain roles 1120-1124 that are responsible for evaluating communications skills. Alternatively, the rules 1140 might select time segments 810 for inclusion in a story 1150 that best highlights the candidate's strengths, especially those strengths that are valued by a particular role 1120-1124.

In still further embodiments, the behavioral analysis data 600 of a candidate 110 are evaluated at the beginning of the recording session. This measurement is used as a baseline, and the performance of the candidate 110 during the remainder of the session is judged against this beginning evaluation. This can be used to determine the time segments 810 of the recording session in which the candidate 110 feels the most comfortable. The rules 1140 can then prioritize the use of those time segments 810 to show to employment managers.

In the context of FIG. 11, in the rules 1140 for the employment manager role 1120, the story 1150 includes time segment seven 1160 where the individual 110 is judged to be the most comfortable and confident.

A large advantage to using rules 1140 to create a story 1150 is that the same rules 1140 can be applied to the recorded session of a variety of individuals 110. In the context of a job interview, an employment manager 1132 would desire to see recorded sessions for multiple candidates 110. Since the same rules 1140 are applied to each individual/candidate 110 (based on the parameters of the user 1132), great efficiencies are gained. Using system 700 and presentation generation data 1100, the employment manager 1132 will automatically only see a portion of each candidate's session, and the portion chosen will be consistent across candidates 110 according to the rules 1140 identified for the employment manager 1132. The employment manager 1132 will see, for instance, each individual's answers to questions on how the individual 110 deals with adversity, handles problems in the workplace, and responds to questions about relocation. In addition, the employment manager 1132 will see that portion of each individual's session that is thought to show the individual 110 at their most comfortable and confident.

Figure 12:
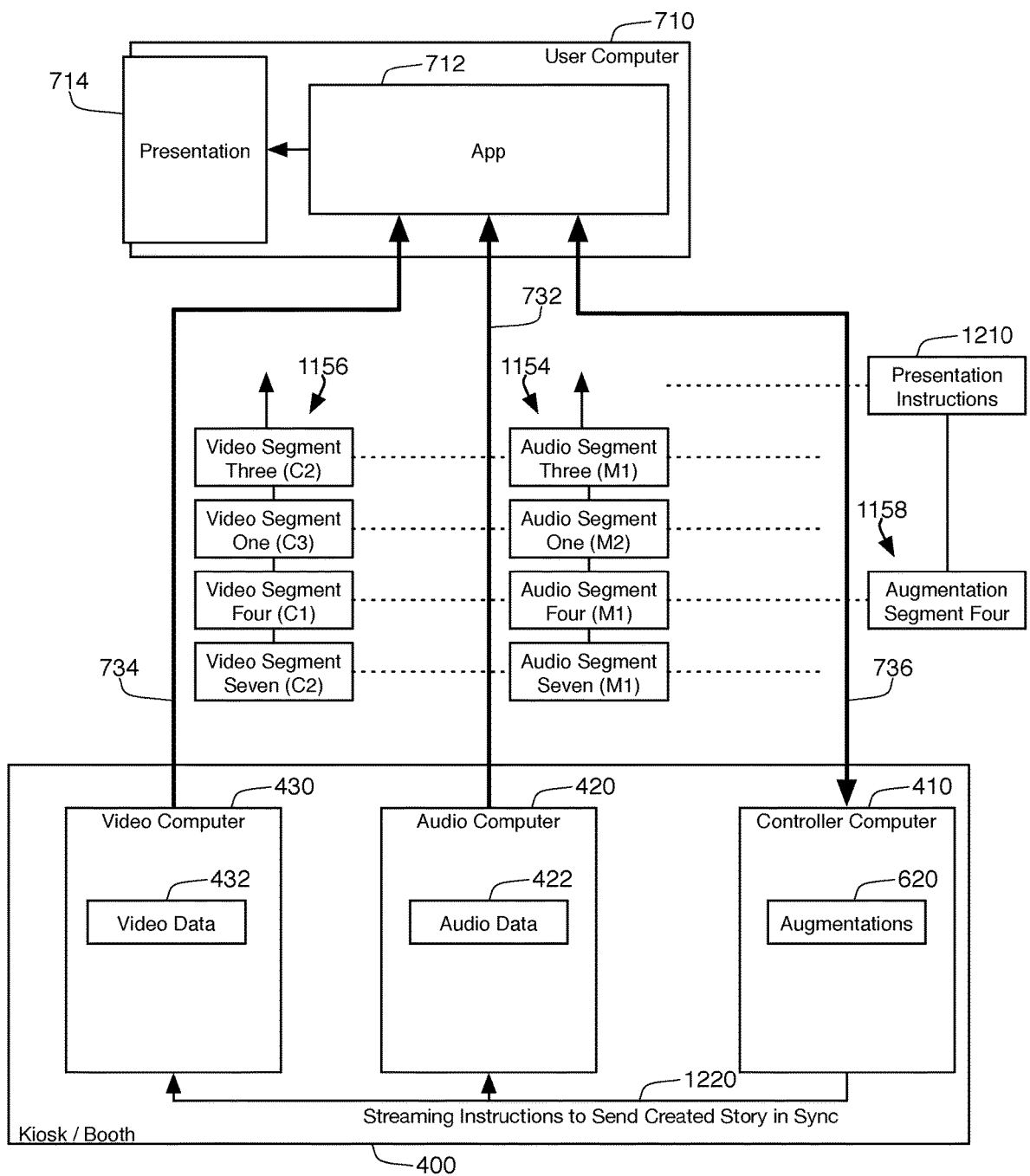
FIG. 12 is a schematic view illustrating an audio stream and a video stream broken into a plurality of segments.

One of the primary benefits of using three separate computers 410, 420, 430 to control, record, and stream data to a user computer 710 is that there is no need to pre-create a limited number of video files for the recording session of the individual 110. Rather, the separate data from all cameras 120 are stored on the video computer 430 as video data 432, and the separate data from all microphones 130 are stored on the audio computer 420 as audio data 422, as shown in FIG. 12. All of this data is available for streaming to the app 712 on the user computer 710, as was shown in FIG. 7 and as is also shown in FIG. 12. When a request from a user computer 710 is received, the controller computer 410 can identify the user, apply rules 1140 for that user, and create a story 1150 customized for that user. In this way, the user is not forced to select from a limited number of pre-created audio-video files, but instead can receive and modify a customized presentation 714 streamed from the same computers 410, 420, 430 that recorded the session.

As shown in FIG. 12, the customized presentation 714 is initiated by the controller computer 410 sending presentation instructions 1210 to the app 712 to prepare the app to receive the audio stream 732 and the video stream 734. The controller computer 410 then provides instructions 1220 to the audio and video computer 420, 430 to send the story-relevant audio segments 1154 and video segments 1156, respectively to the user computer 710. These segments 1154, 1156 are sent in sync with each other as well as any necessary augmentations 1158 (which may be sent by the controller computer 410). This syncing of the different streams 732, 734, 736 is shown by the vertical alignment of the different segments 1154, 1156, 1158 in FIG. 12. The presentation 714 then shows the created story 1150, which contains the best and most relevant portions of the recording session for the user.

Method of Recording and Streaming Session

Figure 13:
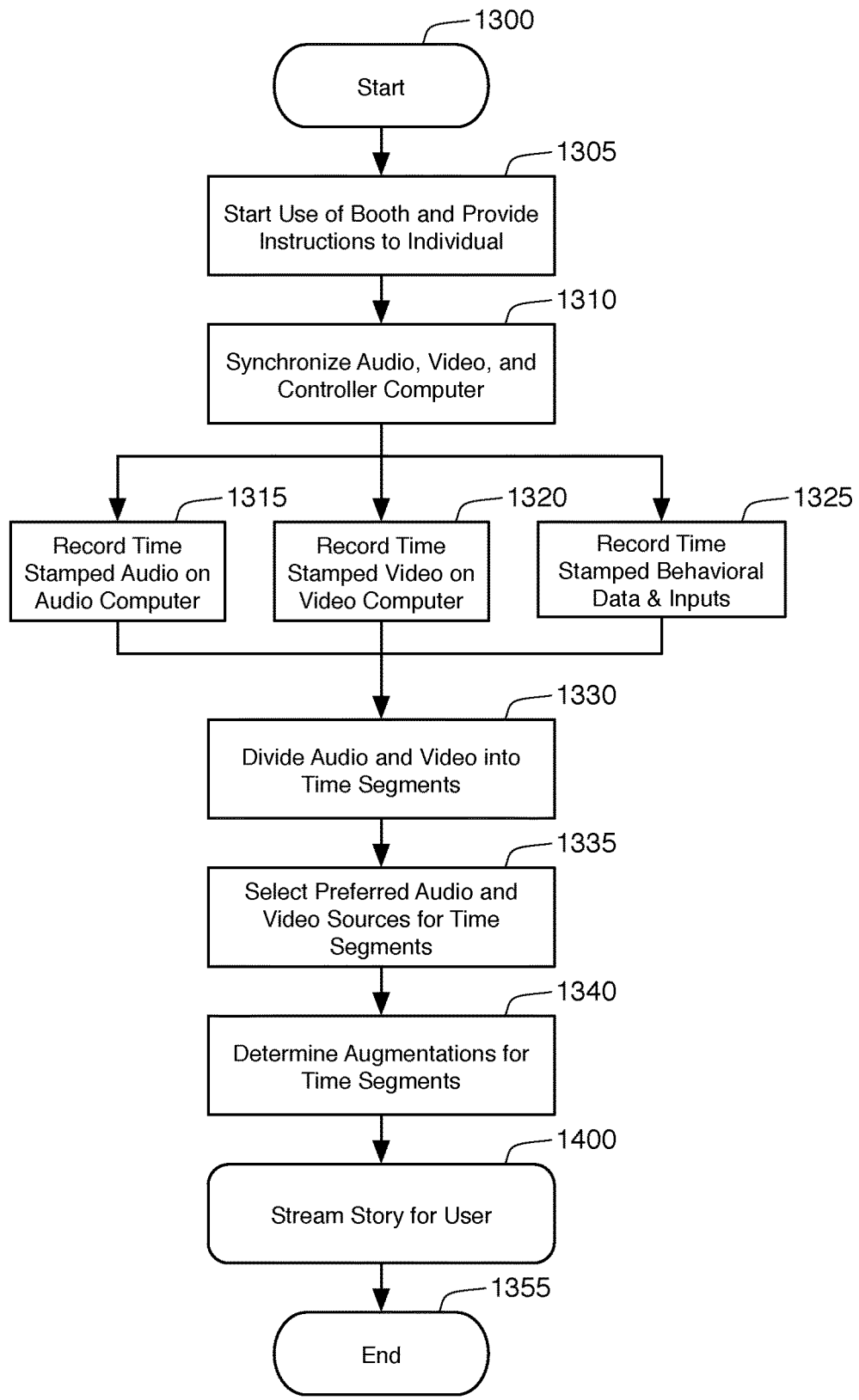
FIG. 13 is a flow chart showing a method of using multiple computers at a booth to record and stream a session.

FIG. 13 shows one embodiment of a method 1300 for recording a session at booth 400. The method 1300 starts at step 1305, in which an individual 110 enters the kiosk or booth 400 and begins a recording session. Instructions 412 are provided to the individual during the use of the kiosk 400. These can be provided over a display 414 or through audio instructions over a speaker interface 416. In one embodiment, the instructions 412 take the form of questions to be answered by the individual 110.

At step 1310, the controller computer 410 instructs the audio computer 420 and the video computer 430 to synchronize with each other, such as by using a system clock or heartbeat signal 500. This step 1310 need not occur after the individual 110 enters the booth, but it should generally occur before any audio or video data 422, 432 is recorded (although post-recording syncing based on a later-received heartbeat signal 500 is possible).

At steps 1315, time-stamped audio data 422 is recorded on the audio computer 420. Each microphone 130 creates its own audio data 910, 920 during this process. At the same time (step 1320), time-stamped video data 432 is recorded on the video computer 430, in which each camera 120 likewise creates its own video data 1010, 1020, 1030. Also, at the same time (step 1325), behavioral data 434 from depth sensors 140 and input data 419 from user input interface 418 are time-stamped and saved as well.

At step 1330, time segments 810 are created, and all of the audio data 422 and video data 432 are likewise divided into those same segments. At step 1335, preferred audio and video sources are selected for each time segment. As explained above, if the video data 1020 from a second camera is better than video data 1010 from a first camera for a particular time segment 810, that video data 1020 will be selected for that segment 810. The same applies to the audio data 910, from the different microphones 130.

In some embodiments, the process for selecting the best sources for a time segment can allow for multiple options depending upon the rules 1140. For instance, some roles 1120-1124 might be so focused on technical capabilities, a camera 120 that better shows the hands of individual 110 while performing some task may be the preferred camera source 120 for that time segment for that role. Other roles are more interested in the emotional reaction of the individual 110, so the rules 1140 would prefer a camera 120 that focused on the face of the individual 110.

At step 1340, augmentations 620 are determined for particular time segments. In some circumstances, multiple augmentations 620 can be created for a single time segment. In other circumstances, no augmentations 620 are created.

At this point, a user such as user 1132 can request that recorded data from an individual's recording session be streamed to their computer 710. This step 1400 is described in more detail as method 1400 shown in FIG. 14. The method 1300 then ends at step 1355.

Figure 14:
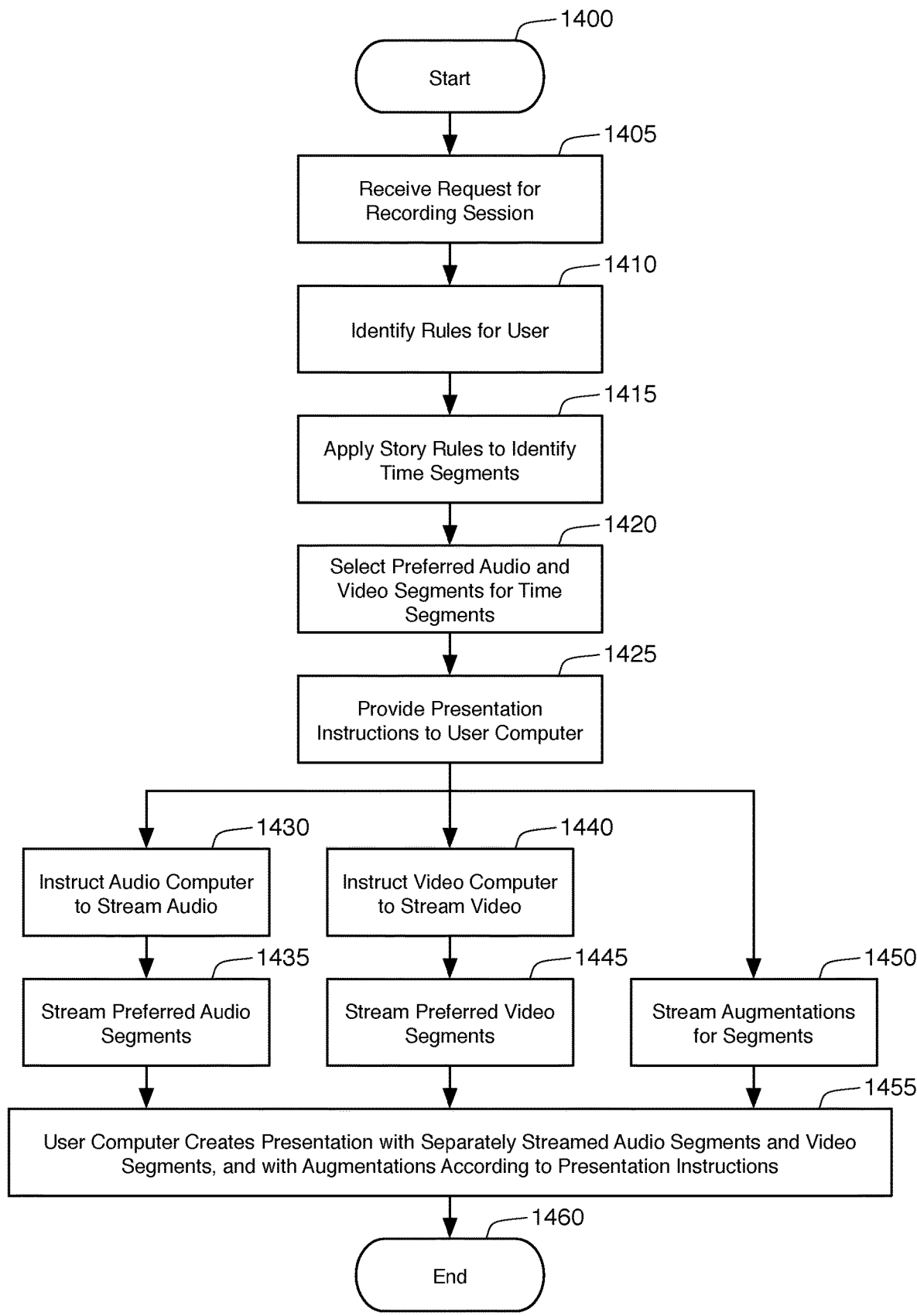
FIG. 14 is a flow chart showing a method of streaming a presentation using multiple computers at the booth.

Method 1400 in FIG. 14 shows the process for streaming a recorded session to a user's computer 710. At step 1405, a request for a streamed recording session is received. In at least one embodiment, the request originated with a request made to a system server 760 that contained organizational content 762 concerning all of the recording sessions made over a plurality of kiosks 400, 770. In response to that search, the user computer 710 selects the recording session of individual 110 made at kiosk 400. The system server 760 instructs or otherwise organizes the direct communication between the user computer 710 and the booth 400. In at least one embodiment, it is the controller computer 410 at the booth 400 that is responsible for coordinating communications with the user computer 710.

At step 1410, rules 1140 are selected for the requesting user (such as user 1132). As explained above, these rules 1140 can be selected based on the user's role 1120, or they can be based on the customer 1110 (usually the user's employer), or they can be customized on a user-by-user basis. At step 1415, the selected rules 1140 are used to create a story 1150 for that user by selecting the appropriate time segments 810 for that user. The preferred audio and video segments selected in step 1335 can then be identified for each time segment. As explained above, the preferred audio and video segments may vary based upon the selected rules 1140.

FIG. 14 shows that steps 1415 (applying the rules 1140) and 1420 (selecting the preferred audio and video) are performed after step 1405 (receiving the user request). It is equally likely that all possible rules for a customer can be pre-applied (step 1415) and the preferred audio and video for each selected segment can be determined (step 1420) before any user request is received at step 1405. In this case, the user request would be received 1405, and the pre-defined story associated with that user would be identified (such as by identifying the rules that created the story in step 1410). At that point, the pre-created story would be ready for presentation.

At step 1425, presentation instructions 1210 are provided to the app 712 operating on the user computer 710. These instructions 1210 inform the app that the audio and video streams 732, 734 are coming. In effect, these instructions 1210 open a pathway for the audio computer 420 to send its audio stream 732 to the app 712 and for the video computer 430 to sends its video stream 734 to the app 712.

At step 1430, the controller computer 410 sends instructions 1220 to the audio computer 420 to send its stream 732, and at step 1435 the audio computer 420 sends the preferred audio segments for the identified time segments 810 in its stream 732. Simultaneously, at step 1440, the controller computer 410 sends instructions 1220 to the video computer to send video stream 734, and at step 1445 the video computer 430 sends the preferred video segments for the identified time segments 810 in its stream 734. Augmentations 620 may also be streamed at step 1450, such as by the controller computer 410 in its stream 736.

Finally, at step 1455, the app 712 on the user computer 710 receives these streams 732, 734, 736, combines them together according to the instructions 1210, and creates the presentation 714. This method 1400 then ends at 1460.

Efficiencies, Backups, and Redundancies

FIG. 15 once again shows the controller computer 410, the audio computer 420, and the video computer 430 all within the confines of the booth 400. As explained above, it is advantageous to have multiple computers 410, 420, 430 to be locally connected to the kiosk or booth 400. In the system 700 of FIG. 7, for example, each of the additional kiosks 770 also have three computers 772, which provide separate streaming of audio streams 732 and video streams 734 when requested to a user computer 710. This distributed streaming of content from a variety of computers 410-430, 772 greatly reduces the need for a large, complex system server 760 that is capable of handling multiple video streams simultaneously. This is especially true in the context of story 1150 creation, where different users will see different versions of the recorded sessions. In this context, it is greatly preferred to distribute the required computer power for providing this data to multiple computers that already exists within the kiosks 400, 770. When it is recognized that these computers 410-430, 772 that create the stories 1150 and provide the streams 732-736 are the same computer that operate the booths 400, 770 and record the audio data 422 and video data 432 from multiple microphones 130 and cameras 120, the efficiencies are even more appreciated. The video computer 430 that handles the video recordings of all cameras 120 in a booth 400 is the same video computer 430 that streams the relevant video segments from the video data 1010, 1020, 1030. Likewise, the audio computer 420 records audio from the microphones 130 and streams the appropriate audio data 910, 920.

Figure 15:
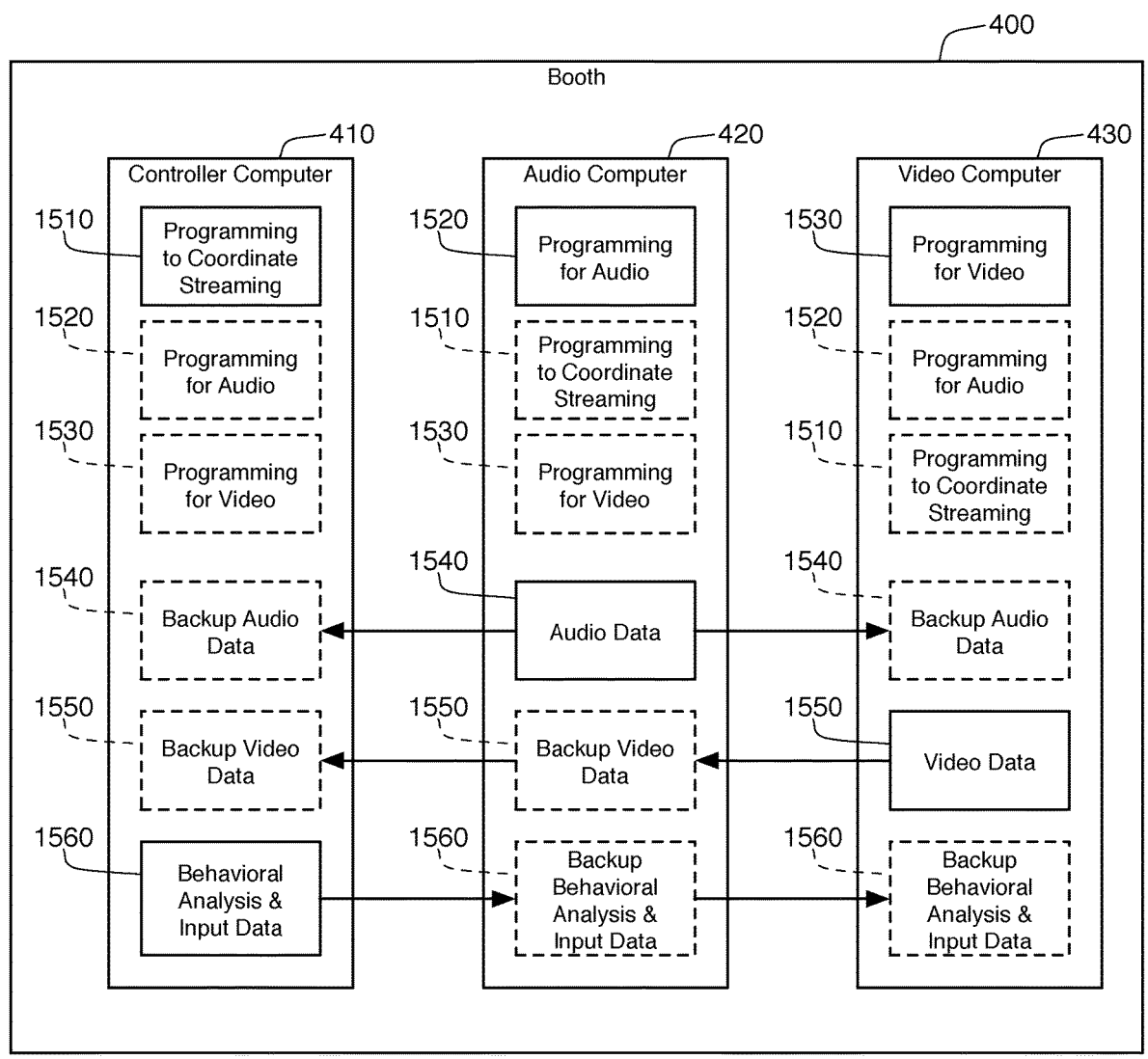
FIG. 15 is a schematic view of a controller computer, an audio computer, and a video computer sharing data and programming to provide data backup and redundancy.

One drawback that could arise from this efficiency is the risk of a single point of failure or loss. Consequently, the three computers 410, 420, 430 in the booth 400 are also responsible for providing data backup and operational redundancy for each other. In FIG. 15, controller computer 410 includes programming 1510 to coordinate recording and streaming activities in general. The audio computer 420 contains programming 1520 to manage audio recording and streaming, while the video computer 430 contains programming 1530 to manage the video recording and streaming. While this is the primary programming 1510, 1520, 1530 operating on each computer 410, 420, 430, respectively, all of this programming 1510, 1520, 1530 is actually found on each computer 410, 420, 430. In FIG. 15, if the programming 1510, 1520, 1530 is not the default programming for the computer 410, 420, 430, it is shown in a dashed box as redundancy programming. If one of the computers 410, 420, 430 fails, this redundancy programming allows another one of the computers 410, 420, 430 to take over the task of the failed computer. If two computers fail, the third computer would be able to manage all tasks. Efficiencies would clearly be lost if one computer 410, 420, 430 had to handle multiple types of tasks, and certain tasks might operate more slowly or at reduced resolution or quality, but all tasks could still be performed.

In addition, FIG. 15 shows that each computer 410, 420, 430 is responsible for providing data backup for the other computers. Thus, audio data 1540 stored on the audio computer 420 is backed up to both the controller computer 410 and the video computer 430. Likewise, video data 1550 is backed up on the audio and controller computers 420, 410, and behavioral analysis and input data 1560 is backed up on audio and video computers 420, 430. Thus, any failure or data loss on one computer can be compensated for by the remaining computer. And the distributed storage and streaming of data shown in FIG. 7 can continue.

In another embodiment, an adjacent booth 1500 may be located in close physical proximity to booth 400. The two booths might even be located on the same physical or wireless local area network. In this context, the controller computer 1570, the audio computer 1580, and the video computer 1590 in the adjacent booth 1500 could provide additional redundancy to the controller computer 410, the audio computer 420, and the video computer 430 of booth 400, respectively. Thus, if audio computer 420 in booth 400 malfunctioned, the audio computer 1580 of the adjacent booth 1500 could provide data backup. This data can have been previously provided to computer 1580, for instance, through regular backup processes. The audio computer 1580 could even replace the processing functioning of the malfunctioning audio computer 420 in booth 400. This type of backup and processing support can also be provided if the computers 410, 420, 430 of the booth are still functioning but are being overloaded. For example, the computers 410, 420, 430 of booth 400 might simultaneously be recording an individual in the booth 400 while streaming a story 1150 to a user computer 710. If two additional streams were requested at the same time, this might overwhelm the processing power of these computers 410, 420, 430. In this context, the controller computer 410 in booth 400 might request that the audio computer 1580 and the video computer 1590 in the adjacent booth 1500 provide these newly requested streams using backup data previously provided by the booth 400. The controller computer 410 would simply provide streaming instructions 1220 to these computers 1580, 1590 in the same manner that it would have provided instructions to computers 420, 430.

Alternative Embodiments

Figure 16:
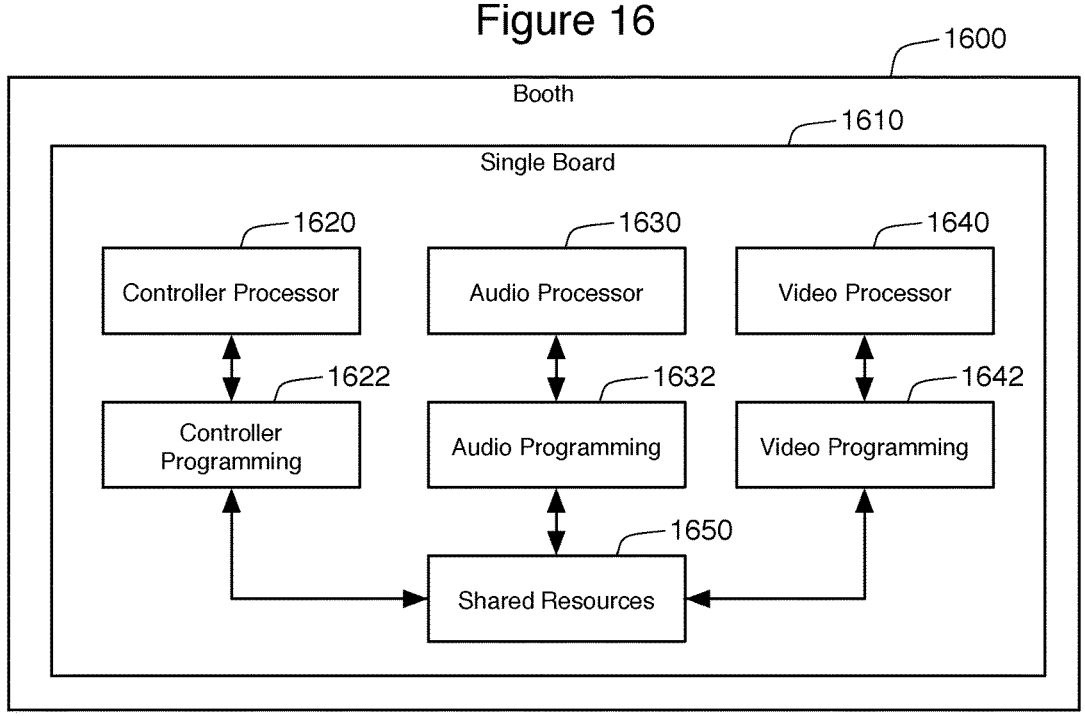
FIG. 16 is an alternative embodiment of a booth using a single board with a controller processor, an audio processor, and a video processor.

The above descriptions emphasize the use of at least three separate computers 410, 420, 430 in a booth 400. This use of distinct computers 410, 420, 430 offers a variety of benefits as explained frequently above. However, some of the benefits and methods described above could be implemented in other booth configurations. In FIG. 16, a single processing board (or motherboard) 1610 is included in the booth 1600. On this one board 1610 are separate processors, namely a controller processor 1620, an audio processor 1630, and a video processor 1640. The separate processors 1620, 1630, 1640 are each separate CPU chips, and are each controlled by separate programming 1622, 1632, 1642, respectively. The programming 1622, 1632, 1642 cause each of their respective processors 1620, 1630, 1640 to operate in the same manner as described above for controller computer 410, audio computer 420, and video computer 430, respectively. As all of the processors 1620, 1630, 1640 reside on the same computer board 1610, they will share resources 1650 that would otherwise have been provided separately to each computer 410, 420, 430. These shared resources 1650 may well create bottlenecks to processing functions that would be avoided with separate computers 410, 420, 430, but the use of multiple processors 1620, 1630, 1640 will reduce cost and space requirements. In other embodiments, one or more GPUs and DSPs (not shown in FIG. 16) can be present on the board 1610 to assist the separate processors 1620, 1630, 1640 in much the same manner as a GPU assists the video computer 430 and a DSP or audio processor assists the audio computer 420.

Figure 17:
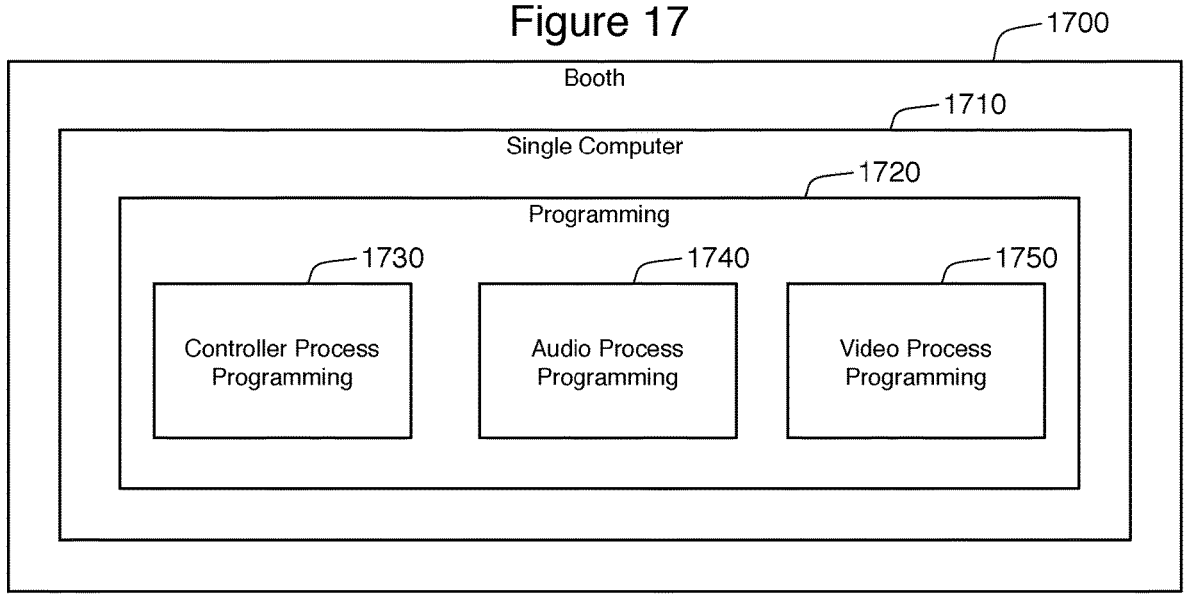
FIG. 17 is an alternative embodiment of a booth using a single computer using controller, audio, and video programming.

FIG. 17 shows a different embodiment of a booth 1700. In this embodiment, the booth 1700 has a single computer 1710 with a single processor 1712 that, like all computer processors, is controlled via programming instructions 1720. These programming instructions 1720 contain programming 1730 for the controller processes described above in connection with the controller computer 410, audio process programming 1740 to handle processes described in connection with the audio computer 420, and video process programming 1750 to handle the processes performed by the video computer 430. While many of the benefits described above in connection with three-computer implementation of booth 400 will not apply to a single computer booth 1700, this booth 1700 could still, for example, create time segmentation data 810 that directs the segmentation of audio and video data 422, 432 as shown in FIGS. 8-10, and could create a story 1150 based on rules 1140 as shown in FIG. 11

As used in this specification and the appended claims, the singular forms include the plural unless the context clearly dictates otherwise. The term "or" is generally employed in the sense of "and/or" unless the content clearly dictates otherwise. The phrase "configured" describes a system, apparatus, or other structure that is constructed or configured to perform a particular task or adopt a particular configuration. The term "configured" can be used interchangeably with other similar terms such as arranged, constructed, manufactured, and the like.

All publications and patent applications referenced in this specification are herein incorporated by reference for all purposes.

While examples of the technology described herein are susceptible to various modifications and alternative forms, specifics thereof have been shown by way of example and drawings. It should be understood, however, that the scope herein is not limited to the particular examples described. On the contrary, the intention is to cover modifications, equivalents, and alternatives falling within the spirit and scope herein.

The many features and advantages of various embodiments are apparent from the above description. Numerous modifications and variations will readily occur to those skilled in the art. Since such modifications are possible, the embodiments are not to be limited to the exact construction and operation illustrated and described. Rather, the present invention should be limited only by the following claims.

What is claimed is:

1. A booth for audiovisual recording of an individual comprising:
   a) an enclosing wall forming a perimeter of the booth and defining a booth interior;
   b) a first camera for taking video images aimed proximally toward the individual in the booth interior;
   c) a first microphone for receiving audio in the booth interior;
   d) a video computer located at the booth, the video computer recording the video images received from the first camera so as to be able to identify a plurality of first camera video segments, wherein the plurality of first camera video segments correspond temporally to a plurality of time segments;
   e) an audio computer located at the booth, the audio computer recording the audio received from the first microphone so as to be able to identify a plurality of first microphone audio segments, wherein the plurality of first microphone audio segments correspond temporally to the plurality of time segments;
   f) a controller computer located at the booth, the controller computer:
      i) managing a plurality of versions of an audiovisual presentation, each version identifying a subset of the plurality of time segments, wherein the subset of the plurality of time segments varies between the plurality of versions of the audiovisual presentation;
      ii) receiving a request from a user computer, the request including user information;
      iii) choosing a selected version of the audiovisual presentation based on the user information;
      iv) identifying the subset of time segments for the selected version of the audiovisual presentation as a selected set of time segments;
      v) instructing the video computer to send a video stream to the user computer, the video stream comprising camera video segments corresponding to the selected set of time segments;
      vi) instructing the audio computer to send an audio stream to the user computer, the audio stream comprising microphone audio segments corresponding to the selected set of time segments; and
      vii) sending presentation instructions to the user computer instructing the user computer to combine the received video stream from the video computer and the received audio stream from the audio computer into a presented version of the audiovisual presentation.

2. The booth of claim 1, further comprising a second camera for taking video images aimed proximally toward the individual in the booth interior, further comprising the video computer recording the video images received from the second camera and identifying a plurality of second camera video segments, wherein the plurality of second camera video segments correspond temporally to the plurality of time segments, still further wherein the video stream comprises first camera video segments and second camera video segments.

3. The booth of claim 2, wherein a preferred video segment is selected between the first camera video segments and the second camera video segment for each of the plurality of time segments, further wherein the video stream utilizes the preferred video segment for each of the selected set of time segments.

4. The booth of claim 2, further comprising a second microphone for receiving sound in the booth interior, further comprising the audio computer recording the audio received from the second microphone and identifying a plurality of second microphone audio segments, wherein the plurality of second microphone audio segments correspond temporally to the plurality of time segments, and still further wherein the audio stream comprises first microphone audio segments and second microphone audio segments.

5. The booth of claim 4, wherein a preferred video segment is selected between the first camera video segments and the second camera video segment for each of the plurality of time segments, further wherein a preferred audio segment is selected between the first microphone audio segments and the second microphone audio segment for each of the plurality of time segments, further wherein the video stream utilizes the preferred video segment for each of the selected set of time segments, and further wherein the audio stream utilizes the preferred audio segment for each of the selected set of time segments.

6. The booth of claim 1, wherein the presentation instructions further comprise augmentations that augment one of the video and audio streams, wherein the presented version of the audiovisual presentation includes the augmentations.

7. The booth of claim 3, wherein the augmentation includes textual information that is superimposed onto a visual portion of the presented version of the audiovisual presentation.

8. The booth of claim 1, further comprising the controller computer providing a plurality of individual instructions to the individual in the booth interior, further wherein each individual instruction is provided at a known instruction time.

9. The booth of claim 8, further comprising a video display located in the booth interior, and wherein the plurality of individual instructions are provided to the user over a user interface on the video display.

10. The booth of claim 8, wherein the plurality of time segments are demarcated from each other in part according to the known instruction times.

11. The booth of claim 10, wherein the plurality of individual instructions include a plurality of questions for the individual, further wherein the presentation instructions comprise textual information identifying the questions presented, wherein the presented version of the audiovisual presentation superimposes the textual information onto a visual portion of the presented version of the audiovisual presentation.

12. The booth of claim 10, wherein a first version of the plurality of versions comprises time segments relating to different set of questions than a second version.

13. The booth of claim 1, wherein the video computer, the audio computer, and the controller computer are all mounted on the enclosing wall of the booth.

14. The booth of claim 1, wherein the plurality of versions of the audiovisual presentations are created according to rules that, based on the user information, select the selected set of time segments.

15. The booth of claim 14, wherein the user information identifies a role for the user computer, wherein the rules select the selected set of time segments based on the role.

16. The booth of claim 1, further comprising a depth sensor for detecting movements of the individual in the interior of the booth, wherein the presentation instructions further comprise augmentations derived from the detected movements of the individual by the depth sensor, wherein the presented version of the audiovisual presentation includes the augmentations.

17. The booth of claim 1, further comprising an input device that receives physical inputs from the individual, wherein the presentation instructions further comprise augmentations derived from the physical inputs received on the input device, wherein the presented version of the audiovisual presentation includes the augmentations.

18. The booth of claim 1, further comprising a remote server system in communication with the controller computer, wherein the remote server system processes search requests from the user computer and assists the user computer in directing the request to the controller computer.

19. The booth of claim 18, wherein personally identifiable information concerning the user is permanently stored at the server system and personally identifiable information concerning the user is not permanently stored at the booth.

20. A method comprising:
a) recording, on a video computer local to a booth, first video data received from a first camera mounted in an interior of the booth, the first video data being recorded during a first session recording an individual within the booth;
b) recording, on the video computer and during the first session, second video data received from a second camera mounted in the interior of the booth;
c) recording, on an audio computer local to the booth and during the first session, first audio data received from a first microphone mounted in the interior of the booth;
d) determining a plurality of time segments for the first session and dividing the first video data, the second video data, and the first audio data into segments that temporally correspond to the plurality of time segments;
e) identifying a preferred video segment for each of the plurality of time segments from between the segments of the first video data the segments of the second video data;
f) managing, at a controller computer local to the booth, a plurality of versions of an audiovisual presentation, each version identifying a subset of the plurality of time segments, wherein the subset of the plurality of time segments varies between the plurality of versions of the audiovisual presentation
g) receiving, at the controller computer local to the booth, a request from a user computer, the request including user information;
h) identifying, at the controller computer, a selected subset of the plurality of time segments for the user computer based on the user information;
i) sending, from the controller computer, instructions to the video computer to send a video stream to the user computer, the video stream comprising the preferred video segments corresponding to the selected subset of the plurality of time segments, wherein the video stream comprises segments from the first video data and segments from the second video data;
j) sending, from the controller computer, instructions to the audio computer to send an audio stream to the user computer, the audio stream comprising segments of the first audio data corresponding to the selected subset of the plurality of time segments; and
k) sending, from the controller computer, presentation instructions to the user computer instructing the user computer to combine the received video stream from the video computer and the received audio stream from the audio computer into a presented version of the audiovisual presentation.

21. A method comprising:
a) recording, on a booth computer local to a booth, first video data received from a first camera mounted in an interior of the booth, the first video data being recorded during a first session recording an individual within the booth;
b) recording, on the booth computer and during the first session, second video data received from a second camera mounted in the interior of the booth;
c) recording, on the booth computer and during the first session, first audio data received from a first microphone mounted in the interior of the booth;
d) determining a plurality of time segments for the first session and dividing the first video data, the second video data, and the first audio data into segments that temporally correspond to the plurality of time segments;
e) identifying a preferred video segment for each of the plurality of time segments from between the segments of the first video data the segments of the second video data;

f) managing, at the booth computer, a plurality of versions of an audiovisual presentation, each version identifying a subset of the plurality of time segments, wherein the subset of the plurality of time segments varies between the plurality of versions of the audiovisual presentation
g) receiving, at the booth computer, a request from a user computer, the request including user information;
h) identifying, at the booth computer, a selected subset of the plurality of time segments for the user computer based on the user information;
i) sending, from the booth computer, a video stream to the user computer, the video stream comprising the preferred video segments corresponding to the selected subset of the plurality of time segments, wherein the video stream comprises segments from the first video data and segments from the second video data;
j) sending, from the booth computer, an audio stream to the user computer, the audio stream comprising segments of the first audio data corresponding to the selected subset of the plurality of time segments; and
k) sending, from the booth computer, presentation instructions to the user computer instructing the user computer to combine the received video stream and the received audio stream into a presented version of the audiovisual presentation.

* * * * *